(12) United States Patent
Dunford et al.

(10) Patent No.: US 8,960,012 B2
(45) Date of Patent: Feb. 24, 2015

(54) METHOD AND APPARATUS FOR DETECTION AND CHARACTERIZATION OF MECHANICAL DAMAGE

(71) Applicant: JENTEK Sensors, Inc., Waltham, MA (US)

(72) Inventors: Todd M. Dunford, Amherst, MA (US); Neil J. Goldfine, Newton, MA (US); Shayan Haque, Cambridge, MA (US)

(73) Assignee: JENTEK Sensors, Inc., Waltham, MA (US)

( * ) Notice: Subject to any disclaimer, the term of this patent is extended or adjusted under 35 U.S.C. 154(b) by 0 days.

(21) Appl. No.: 14/067,784

(22) Filed: Oct. 30, 2013

(65) Prior Publication Data

US 2014/0182389 A1 Jul. 3, 2014

Related U.S. Application Data

(60) Provisional application No. 61/720,253, filed on Oct. 30, 2012.

(51) Int. Cl.
  *G01L 1/00* (2006.01)
  *G01B 7/24* (2006.01)
  *G01R 33/02* (2006.01)
  *G01M 5/00* (2006.01)

(52) U.S. Cl.
  CPC .......... *G01M 5/0025* (2013.01); *G01M 5/0033* (2013.01); *G01M 5/0083* (2013.01)
  USPC .......... 73/779; 73/862.68; 324/209; 324/238; 324/240

(58) Field of Classification Search
  USPC ................ 324/209, 238, 240; 73/862.69, 779
  See application file for complete search history.

(56) References Cited

U.S. PATENT DOCUMENTS

| | | | |
|---|---|---|---|
| 5,589,770 A * | 12/1996 | Saitou | 324/209 |
| 6,591,661 B2 * | 7/2003 | Davey | 73/38 |
| 6,784,662 B2 * | 8/2004 | Schlicker et al. | 324/242 |
| 7,049,811 B2 * | 5/2006 | Schlicker et al. | 324/242 |
| 7,188,532 B2 * | 3/2007 | Goldfine et al. | 73/779 |
| 7,836,783 B2 * | 11/2010 | Lifvenborg | 73/862.69 |
| 7,876,094 B2 * | 1/2011 | Goldfine et al. | 324/209 |
| 8,222,897 B2 * | 7/2012 | Sheiretov et al. | 324/242 |
| 8,237,433 B2 * | 8/2012 | Goldfine et al. | 324/238 |
| 8,415,947 B2 * | 4/2013 | Sheiretov et al. | 324/242 |
| 8,553,494 B2 * | 10/2013 | Barolak | 367/35 |
| 2004/0004475 A1 * | 1/2004 | Goldfine et al. | 324/242 |
| 2004/0056654 A1 * | 3/2004 | Goldfine et al. | 324/239 |
| 2006/0009865 A1 * | 1/2006 | Goldfine et al. | 700/29 |
| 2006/0186880 A1 * | 8/2006 | Schlicker et al. | 324/242 |
| 2007/0114993 A1 * | 5/2007 | Goldfine et al. | 324/239 |

(Continued)

*Primary Examiner* — Lisa Caputo
*Assistant Examiner* — Jonathan Dunlap
(74) *Attorney, Agent, or Firm* — Hamilton, Brook, Smith & Reynolds, P.C.

(57) ABSTRACT

Yield stress is an important indicator of the strength of a component such as a pipe section. A method and apparatus for measuring yield stress of components made from magnetic materials is provided. The magnetic permeability of the material is recorded at multiple stress levels below yield establishing a permeability-stress relationship. The yield stress is then estimated as a function of the recorded permeability-stress relationship. The permeability stress relationship may be non-linear for a range of stress levels, achieving a peak permeability response for a stress below yield. The yield stress may be estimated as a multiple of the stress at which the peak permeability response is recorded.

20 Claims, 30 Drawing Sheets
(15 of 30 Drawing Sheet(s) Filed in Color)

(56) References Cited

U.S. PATENT DOCUMENTS

2007/0227255 A1* 10/2007 Goldfine et al. ............... 73/779
2013/0074606 A1* 3/2013 Carlsson et al. ............... 73/779
2014/0160889 A1* 6/2014 Barolak ......................... 367/35

* cited by examiner

METHOD AND APPARATUS FOR DETECTION AND CHARACTERIZATION OF MECHANICAL DAMAGE

RELATED APPLICATION

The present application claims the benefit under 35 U.S.C. §119(e) to U.S. provisional patent application, U.S. Ser. No. 61/720,253, filed Oct. 30, 2012, which is herein incorporated by reference in its entirety.

GOVERNMENT SUPPORT

This invention was made with government support under DTPH56-10-T-000009 from DOT Contract. The government has certain rights in the invention.

BACKGROUND OF THE INVENTION

The yield strength of a material represents the amount of force the material can withstand before plastically deforming. Operating a component close to yield may be desirable to maximize the value of the asset. For example, increasing product flow within a pipeline results in greater product delivery, but puts the same pipeline under greater stress, increasing the risk of pipeline failure. Accordingly, knowing the yield strength of a component allows an operator to better utilize an asset.

The Villari effect (or inverse magnetostriction) describes the change in magnetic susceptibility observed when some materials are subject to a mechanical stress.

SUMMARY OF THE INVENTION

Yield stress is an important indicator of the strength of a component such as a pipe section. A method and apparatus for measuring yield stress of components made from magnetic materials is provided. The magnetic permeability of the material is recorded at multiple stress levels below yield establishing a permeability-stress relationship. The yield stress is then estimated as a function of the recorded permeability-stress relationship. The permeability stress relationship may be non-linear for a range of stress levels, achieving a peak permeability response for a stress below yield. The yield stress may be estimated as a multiple of the stress at which the peak permeability response is recorded.

One aspect relates to a method for estimating yield stress of a component. The method comprises (i) positioning a sensor proximal to the component; (ii) measuring, with at least an impedance instrument and the sensor, magnetic permeability of the component at a plurality of stress levels; and (iii) estimating the yield stress as a function of the magnetic permeabilities and the corresponding stress levels.

In some embodiments, estimating the yield stress comprises estimating a peak magnetic permeability and corresponding stress level from the measured magnetic permeabilities and estimating the yield stress as a function of the stress level corresponding to the peak magnetic permeability. The function used to estimate the yield stress may be a multiple of the stress level corresponding to the peak magnetic permeability. For example, the yield stress is estimated as two times the stress level corresponding to the peak magnetic permeability.

In some embodiments the component is a pipe and the sensor is positioned at an inside surface of the pipe. The operating pressure inside the pipe may be varied to achieve the plurality of stress levels for the measuring act. The measuring with at least the impedance instrument and the sensor may comprise running an in-line inspection (ILI) tool inside the pipe with the impedance instrument and the sensor integrated into the ILI tool. The method may be used to identify a material type of a segment or joint of the pipe using the estimated yield stress.

The plurality of stress levels may be estimated using an independent measure. The independent measure may be a strain gauge and a stress-strain relationship. As another example, the component may be a pipe and the independent measure for estimating the stress level may be a pressure inside the pipe.

In some embodiments, the sensor is an eddy-current sensor. In some embodiments, the sensor is a magnetoresistive sensor.

In some embodiments the component is a pipe, the positioning comprises positioning the sensor proximal to an outside surface of the pipe, and the plurality of stress levels are achieved by pressurizing the pipe to a first pressure and a second pressure.

Another aspect of the invention relates to an apparatus for estimating the yield strength of a component. The apparatus comprises a magnetic permeability sensor, a second sensor, and a processor. The magnetic permeability sensor is positioned near the component and configured to determine the magnetic permeability of the component. The second sensor is configured to measure a property from which stress level of the component is determined. The processor is configured to determine a magnetic permeability-stress relationship from data recorded by the magnetic permeability sensor and the second sensor, and estimate the yield stress from the determined magnetic permeability-stress relationship.

In some embodiments, the processor is configured to identify a peak in the magnetic permeability-stress response and estimate the yield stress as a multiple of the stress level at the peak. For example, the multiple may be in the range of 1.8 to 2.5.

In some embodiments, the magnetic permeability sensor is an eddy-current sensor.

In some embodiments, the magnetic permeability sensor and second sensor are integrated into an inline inspection tool. The second sensor may be a pressure sensor in the ILI tool.

The foregoing is a non-limiting summary of the invention, which is defined by the attached claims.

BRIEF DESCRIPTION OF THE DRAWINGS

The patent or application file contains at least one drawing executed in color. Copies of this patent or patent application publication with color drawings will be provided by the Office upon request and payment of the necessary fee.

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

A description of example embodiments of the invention follows.

The inventors have recognized and appreciated that stress on a magnetizable material may be estimated from measurements of the magnetic permeability (hereinafter simply "permeability") of the material. Further the yield stress of the material may be estimated from the permeability-stress relationship at lower stress levels. A method and apparatus for measuring a material's permeability and relating it to material stress and yield stress are provided. Materials include steels, cobalt, nickel, and alloys thereof; though the stress of any material exhibiting a suitable permeability-stress relationship may be characterized.

Figure 1:
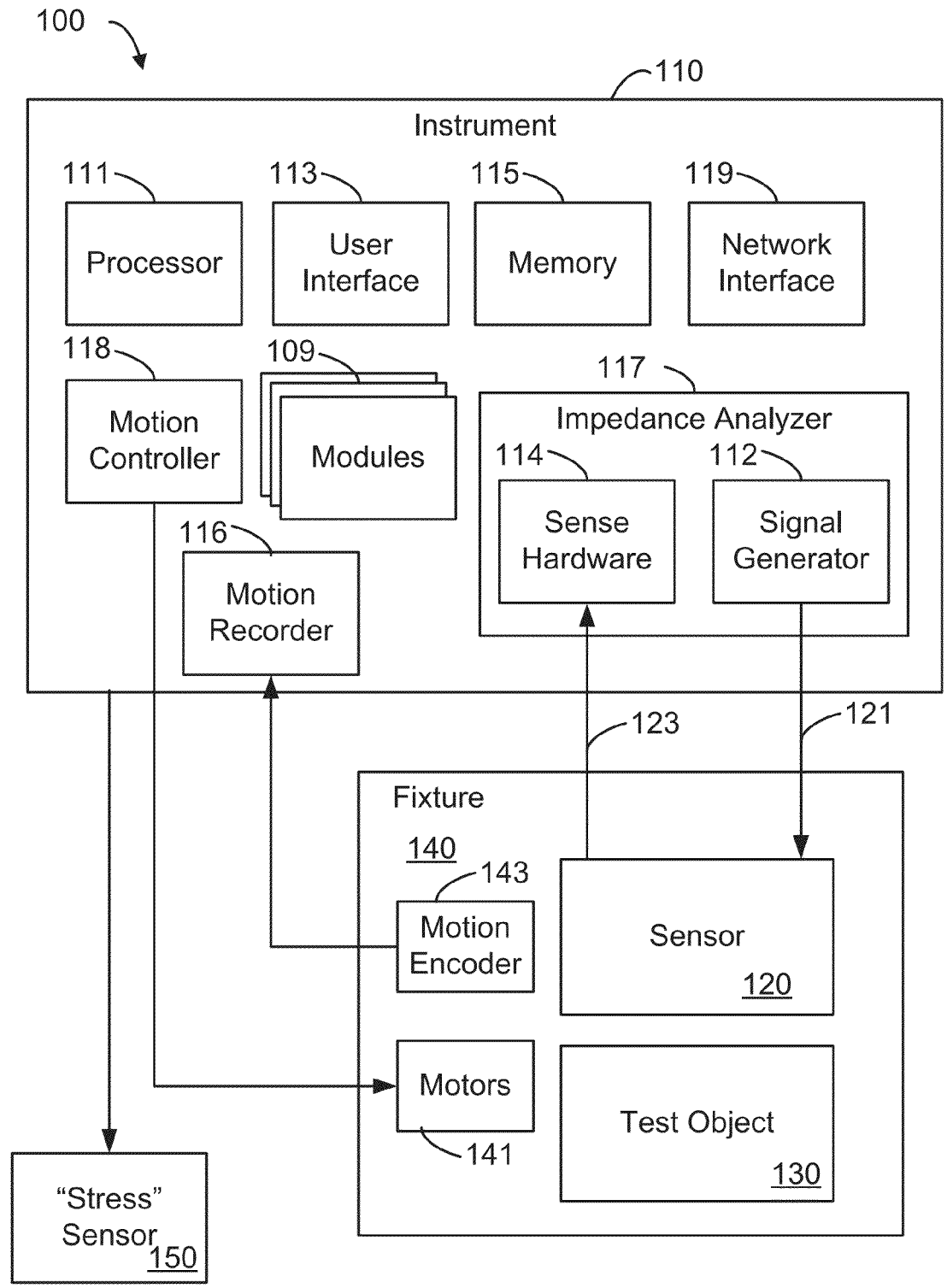
FIG. 1 is a block diagram of an non-destructive testing (NDT) system according to some embodiments.

FIG. 1 shows a block diagram of a NDT system 100 for inspecting a test object 130. Such as system may be used for measuring the permeability of a material. Test object 130 may be a component, subcomponent, a feature thereof, a damage standard (e.g., fatigue coupon), or any other object to be tested by system 100.

System 100 includes an instrument 110 and a sensor 120. Instrument 110 is configured to provide excitation signals 121 to sensor 120 and measure the resulting response signals 123 of sensor 120. Measured response signals 123 may be processed to estimate properties of interest, such as electrical properties (e.g., conductivity, permeability, and permittivity), geometric properties (e.g., thickness, sensor lift-off), material condition, or any other suitable property or combination thereof.

Instrument 110 may include a processor 111, a user interface 113, memory 115, an impedance analyzer 117, and a network interface 119. Though, in some embodiment, instrument 110 may include other combinations of components. While instrument 110 is drawn as a single block, it should be appreciated that instrument 110 may be physically realized as a single "box"; multiple, operably-connected "boxes", or in any other suitable way. For example, in some embodiments it may be desired to provide certain components of instrument 110 as proximal to sensor 120 as practical, while other components of instrument 110 may be located at greater distance from sensor 120.

Processor 111 may be configured to control instrument 110 and may be operatively connected to memory 115. Processor 111 may be any suitable processing device such as for example and not limitation, a central processing unit (CPU), digital signal processor (DSP), controller, addressable controller, general or special purpose microprocessor, microcontroller, addressable microprocessor, programmable processor, programmable controller, dedicated processor, dedicated controller, distributed network of processors, or any suitable processing device. In some embodiments, processor 111 comprises one or more processors, for example, processor 111 may have multiple cores and/or be comprised of multiple microchips.

Memory 115 may be integrated into processor 111 and/or may include "off-chip" memory that may be accessible to processor 111, for example, via a memory bus (not shown). Memory 115 may store software modules that when executed by processor 111 perform desired functions. Memory 115 may be any suitable type of non-transient computer-readable storage medium such as, for example and not limitation, RAM, a nanotechnology-based memory, one or more floppy disks, compact disks, optical disks, volatile and non-volatile memory devices, magnetic tapes, flash memories, hard disk drive, circuit configurations in Field Programmable Gate Arrays (FPGA), or other semiconductor devices, or other tangible, non-transient computer storage medium.

Instrument 110 may have one or more functional modules 109. Modules 109 may operate to perform specific functions such as processing and analyzing data. Modules 109 may be implemented in hardware, software, or any suitable combination thereof. Memory 115 of instrument 110 may store computer-executable software modules that contain computer-executable instructions. For example, one or more of modules 109 may be stored as computer-executable instructions in memory 115. These modules may be read for execution by processor 111. Though, this is just an illustrative embodiment and other storage locations and execution means are possible.

In some embodiments, modules 109 include a sensor data processing module that estimates properties of test object 130. The sensor data processing module may utilize property grids stored in memory 115. Property grids are multi-dimensional precomputed databases that relate one or more sensor measurements (e.g., frequency transimpedance measurements to properties to be estimated). The sensor data processing module may take the property grids and sensor data and, using grid methods, estimate material properties.

User interface 113 of instrument 110 may include devices for interacting with a user of NDT system 100. Devices of the user interface may include, by way of example and not limitation, a keypad, pointing device, camera, display, touch screen, audio input and audio output, or any other suitable interface for interacting with the user.

Network interface 119 may be any suitable combination of hardware and software configured to communicate over a network. For example, network interface 119 may be implemented as a network interface driver and a network interface card (NIC). The network interface driver may be configured to receive instructions from other components of instrument 110 to perform operations with the NIC. The NIC provides a wired and/or wireless connection to the network. The NIC is configured to generate and receive signals for communication over network. In some embodiments, instrument 110 is distributed among a plurality of networked computing devices. Each computing device may have a network interface for communicating with the other computing devices forming instrument 110. Cabling for the network may be parallel, multiplexed, or a hybrid of the two with modular and reconfigurable constructs.

Instrument 110 provides excitation signals for sensor 120 and measures the response signal from sensor 120 using impedance analyzer 117. Impedance analyzer 117 may contain a signal generator 112 and sense hardware 114.

Signal generator 112 provides an excitation signal to sensor 120. In some embodiments signal generator 112 may be configured to provide multiple excitation signal outputs. Signal generator 112 may utilize a multiplexer to time-share the signal generation function among the multiple outputs or may have parallel signal generation hardware to provide multiple output signals simultaneously. Multiple outputs may be used to drive multiple sensors, or a sensor with multiple drive elements. Signal generator 112 may provide a suitable voltage and/or current waveform for driving sensor 120. For example, signal generator 112 may provide a sinusoidal signal at one or more selected frequencies, a pulse, a ramp, or any other suitable waveform.

Sense hardware 114 may comprise one or more sensing channels for measuring a sensing element response. In some embodiments, sense hardware 114 has a plurality of parallel channels so that multiple sense channels may be simultaneously measured. Multiplexing may be used where the number of sense elements, for example, exceeds the number of sensing channels available in sense hardware 114. Though, other configurations may be used. Sense hardware 114 may measure sensor transimpedance for one or more excitation signals at on one or more sense elements of sensor 120. It should be appreciated that while transimpedance (sometimes referred to simply as impedance), may be referred to as the sensor response, the way the sensor response is represented is not critical and any suitable representation may be used. In some embodiments, sense hardware 114 also measures a property of the output of signal generator 112. For example, sense hardware 114 may measure the voltage or current of the drive signal provided by signal generator 112. Once sense hardware 114 has measured the sensor response, the sensor response may, for example, be stored in memory 115.

Sensor 120 may be any suitable sensing technology or combination of sensing technologies for interrogating test object 130. Sensor 120 may be, for example and not limitation, an eddy-current sensor or a magnetoresistive sensor. In some embodiments, sensor 120 is a linear drive eddy-current sensor such as an MWM® or MWM®-Array available from JENTEK Sensors, Inc., Waltham, Mass. Sensor 120 may have a single or multiple sensing and drive elements. Sensor 120 may be scanned, fixtured to, mounted on, or embedded into test object 130.

As discussed above in connection with sensor 120, a fixture 140 may be used to position sensor 120 with respect to test object 130. Where sensor 120 requires close proximity to test object 130, such as for a ultrasonic test sensor or eddy current test sensor, fixture 140 may closely conform sensor 120 with test object 130. Fixture 140 may also be configured to hold test object 130 in a predetermine position. Fixture 140 may be a stationary fixture, manually controlled, motorized fixture, or any suitable combination thereof. For scanning applications where fixture 140 moves sensor 120 relative to test object 130, it is not critical whether sensor 120 or test object 130 is moved, or if both are moved to achieve the desired scan. In some embodiments, NDT system 100 is integrated into fixture 140. For example, NDT system 100 may be an in-line inspection (ILI) tool for inspecting pipes.

NDT system 100 may have one or more motors 141 that are controlled by motion controller 118. Motion controller 118 may control fixture 140 to move sensor 120 relative to test object 130 during an inspection procedure. Though, in some embodiments, relative motion between sensor 120 and test object 130 is controlled by the operator directly (e.g., by hand) or another force (e.g., flow of product in a pipe). Regardless of whether motion is controlled by motion controller 118 or directly by the operator, position encoders 143 and motion recorder 116 may be used to record the relative positions of sensor 120 and test object 130. The position information recorded by motion recorded 116 may be used to spatially register the sensor data obtained by instrument 110 may therefore be spatially registered with the test object 130.

In some embodiments, a mechanical load is applied by a loading apparatus (not shown) to test object 130. The loading apparatus may impose a static load, a dynamic load, loading in in one or more orientations, loading in a linear direction, bending loads, torsional loading, or any other type of loading or combination thereof. The loading apparatus may be configured to vary the load applied to test object 130. For example, low-cycle or high-cycle fatigue may be administered with intermediate pauses to permit inspection of test object 130. In some embodiments the loading apparatus is a servo-hydraulic fatigue testing machine, servo-pneumatic fatigue testing machine, or any other suitable apparatus for loading test object 130. In some embodiments loading is achieved in alternate ways such as during field operation of the test object (e.g., varying product flow/pressure in a pipe).

The mechanical load may be monitored by "stress" sensor 150. Sensor 150 may measure a property from which stress can be determined using a suitable model. For example, sensor 150 may be a strain gauge. The stress-strain relationship may be modeled as linear below yield and constant above yield. A more sophisticated stress-strain model may be used to relate the strain gauge measurements to stress and this example is merely illustrative. As another example, sensor 150 may be a pressure sensor. Pressure may be related to the stress (e.g., hoop, longitudinal) experienced in a pipe with the measured internal pressure and known pipe geometry (e.g., interior diameter, wall thickness). Any suitable sensor may be used as "stress" sensor 150 provided the sensor response can be related (quantitatively or qualitatively) to the stress experience by test object 130.

Figure 2:
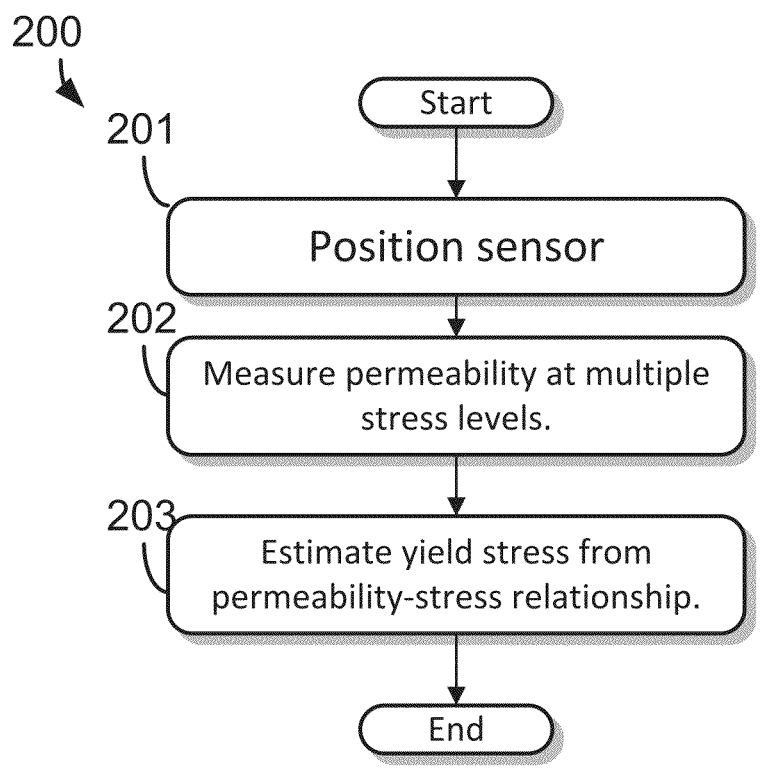
FIG. 2 shows a flow diagram of a method for estimating yield strength according to some embodiments.

Attention is now turned to method 200, shown in FIG. 2. Method 200 is a method for estimating yield stress of a component. Estimating the yield stress of a component may be useful, for example, to determine the operating conditions under which the component may be used. This testing may be needed, for example, when documentation recording the specification of the component has been lost, the specification is believed to be incorrect, no specification was made, or conditions may have changed the properties of the component.

For example and not limitation, the component may be a pipe, tank or vessel, aerospace component, coupons, specimen, or other component made from any material that exhibits a suitable stress-permeability relationship. Common materials that exhibit a suitable relationship include steel, cobalt, nickel, and alloys thereof. Though, other suitable materials may be used. (Note "pipe" is used generically to refer to a hollow structure for transporting products such as liquids or gas. The distinction between pipes, tubes, pipeline, and other structures of such function as used in various industries, is not critical.)

At step 201 a sensor is placed proximal to the component. Depending upon the sensor technology, the sensor may be placed in contact with a surface or separated by a gap. The gap may have a material that the sensor is not sensitive to or through which the sensor is still sensitive to the permeability of the component. For example, an eddy-current or magnetoresistive sensor may have a lift-off gap separating the sensor from the component. In a pipe application, for example, an insulation material may separate the sensor from the pipe. In a pipe with a cladding layer, for example, the sensor could be placed over the cladding layer but operating in such a way as to achieve sensitivity to the pipe material.

The sensor may be placed to measure the permeability at the orientation stress is to be measured in. In some embodiments, multiple sensors are used to measure permeability in different orientations. Such configurations may allow multiple stress orientations to be resolved. An array of sensor elements may be used to characterize or average permeability over an area. Alternatively or additionally sensors with different sensitivity profiles may be used to provide independent information. For example, eddy-current sensors with different spatial wavelengths may be used.

In some embodiments, the sensor and instrumentation are part of an in-line inspection (ILI) tool for pipe inspection. The ILI tool is operated with the sensor placed near the interior surface of the pipe.

At step 202 the permeability of the component is measured at multiple stress levels below yield. As yield stress may be unknown this may be achieved by gradually increasing the stress until the characteristic features of the permeability-stress relationship are identified (see, e.g., step 203). In some embodiments the sensor is measured using an impedance instrument such as that described in connection with NDT system 100 (FIG. 1). The impedance measurement may be taken at multiple frequencies or on each of multiple sensors to provide sufficient independent information to estimate the permeability of the component at the location of interest.

Some sensors may be sensitive to properties of the component, and other environmental factors in addition to the permeability of the component (e.g., sensor lift-off, component conductivity, component geometry). The sensor response due to these other parameters may be separated to identify the permeability response. Any suitable method may be used to relate the sensor response to the permeability of the material. For example, a multivariate inverse method using a database of measurement responses precomputed using a physics based model may be used.

At step 202 the stress may be recorded using an independent measure. In some embodiments, a strain gauge is used to record strain and a strain-stress relationship is used to determine the stress in the component. Continuing the example of a pipe application, the pressure inside the pipe may be recorded and used to determine the stress on the pipe. These examples are illustrative and any suitable independent measure may be used to determine the stress on the component.

Figure 25:
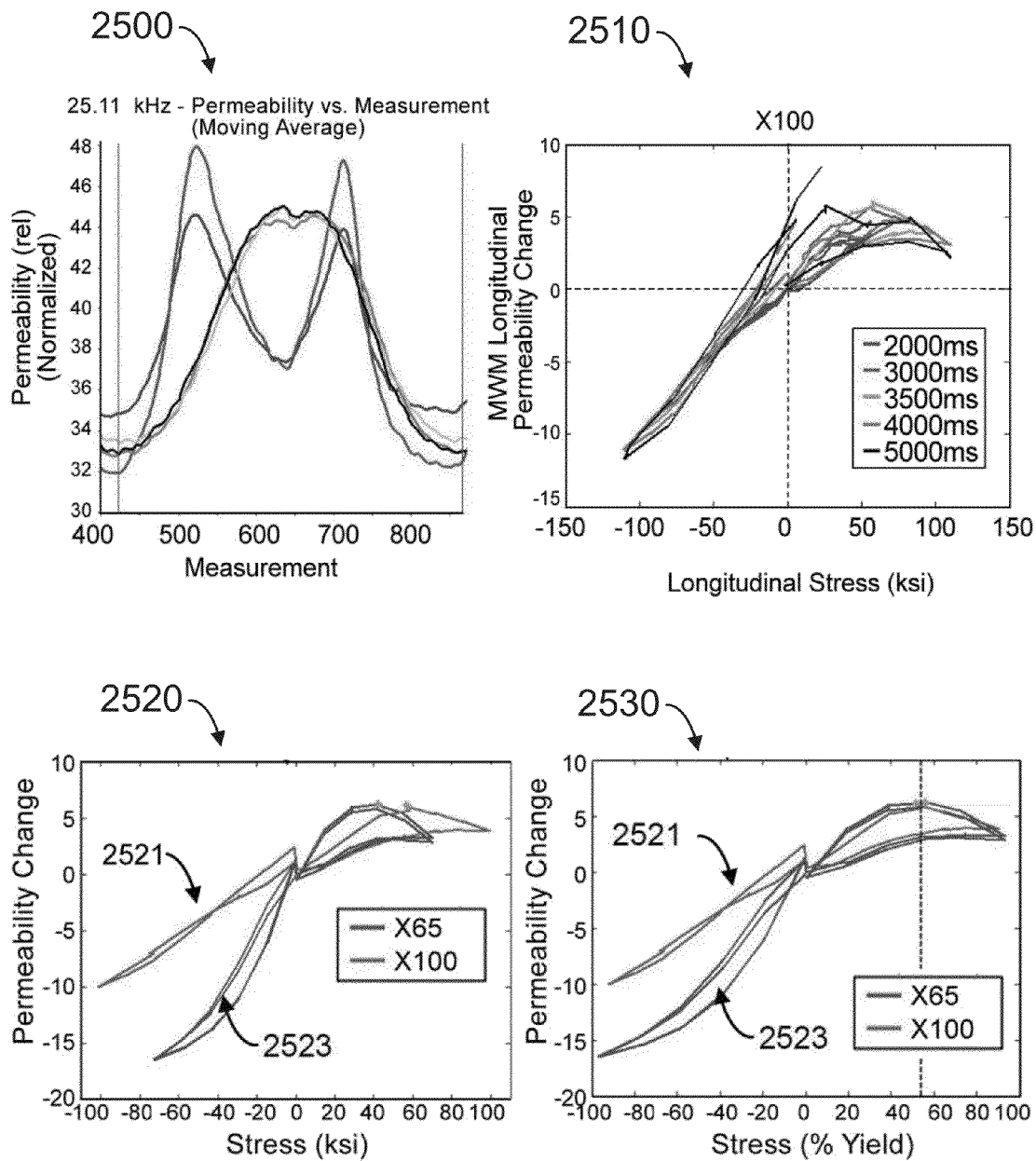
FIGS. 25-30 plot permeability data collected during validation testing.

At step 203 the yield stress is estimated from the permeability-stress relationship recorded at step 202. In some embodiments, the yield stress is estimated based on the location of a peak in the permeability during tension. The peak may be taken directly from the data or estimated based on a curve fit to the permeability-stress data. Plots 2520 and 2530 in FIG. 25 show the permeability-stress relationship for two materials, X65 and X100 grade pipe steel over multiple stress cycles. Plot 2520 shows stress in kilopounds per square inch (ksi) and plot 2530 shows stress as a percentage of the yield strength. The permeability stress relationship for X65 and X100 are shown as plot lines 2523 and 2521, respectively. Notably, the relationship is substantially linear in the compression regime, and non-linear in the tension regime. In the tension regime the permeability reaches a peak at approximately 50% of the yield stress for X65 and X100. In some embodiments the yield strength is estimated at step 203 as approximately twice the stress at the peak permeability response. The precise multiple may be adjusted based on tests where a test component is allowed to reach yield. Also, depending on factors such as the accuracy of the permeability measurement, stress levels tested, material and desire for a conservative or an aggressive estimate, the function may be adjusted. For example, the multiple may be any of 1.4, 1.5, . . . 2.9, or 3.0, any value within the range (e.g., 2.05), or any value within any subrange of the range (e.g., within the subrange of 1.8 to 2.5). Nevertheless, any suitable value may be used.

Method 200 may be performed in a stationary mode or a scanning mode. For example, as part of an ILI tool the sensor and instrumentation may record permeability values inside a pipe. The ILI run may be repeated at multiple pressure levels such that the stress on the pipe is varied. (The ILI tool may include a pressure gauge.) The results may be used to estimate the yield stress of the pipe. Pipe joints or sections may have different yield stresses. Such a utilization of method 200 may be used to identify the material used in each section of the pipe and to evaluate whether the proper materials were used. If a "weak" section of pipe is identified this information could be used to locate and replace such a section.

Once the yield stress of the component has been estimated the component may be operated in accordance with the estimated value.

Figure 3:
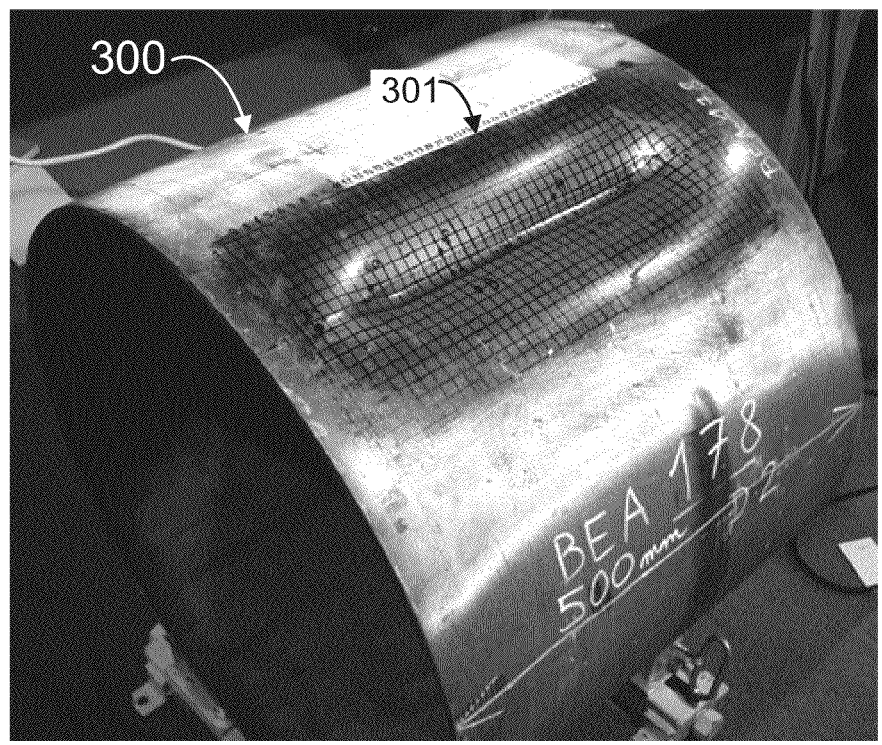
FIG. 3 shows images of mechanically damaged pipe section used for validation and operation of a sensor and scanner according to some embodiments.
Figure 3:
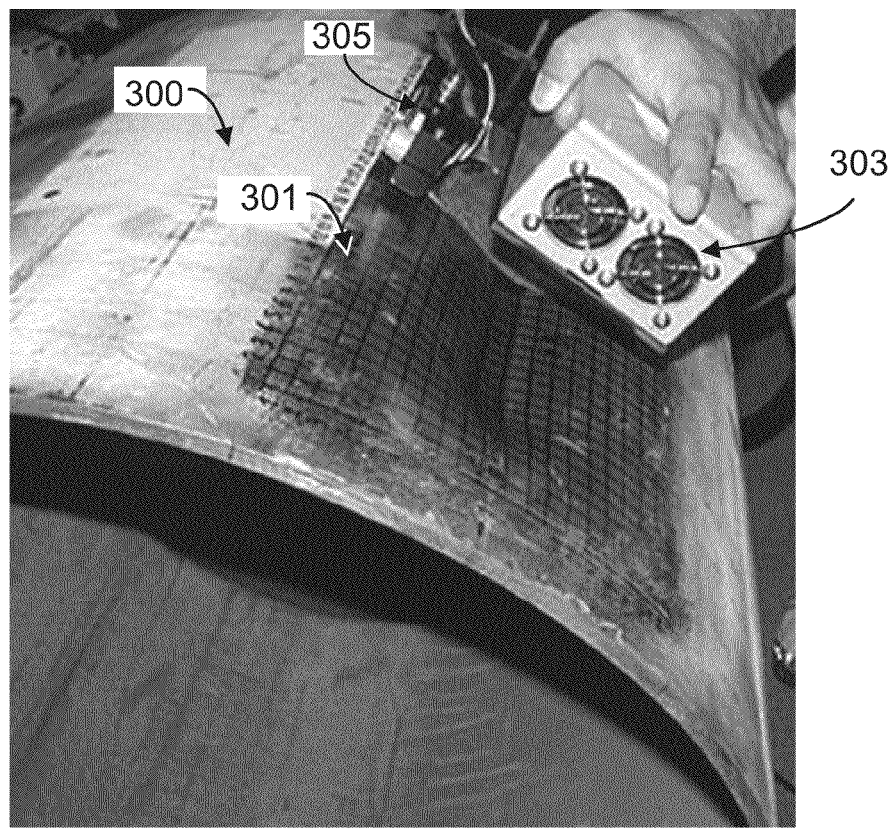
Figure 4:
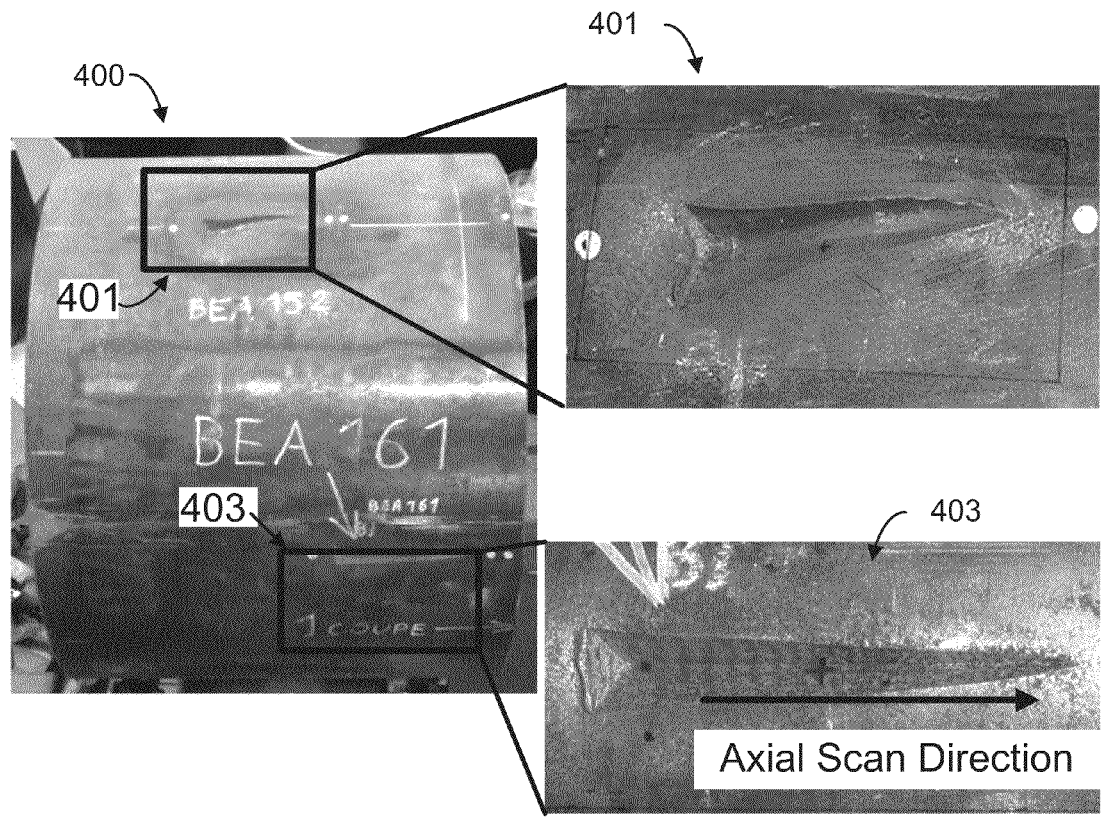
FIG. 4 shows images of mechanically damaged pipe section used for validation.

Having described NDT system 100 and method 200, attention is now turned to some of the validation testing results. Pipe sections 300 and 400 with three mechanical damage regions 301, 401, and 403 are shown in FIGS. 3 and 4. Each pipelines section is a sample of a pipeline approximately 24-in. long, with an outside diameter of 24-in. and 0.25-inch wall thickness. There are three distinct regions of mechanical damage. Damage region 301 on sample 300 is approximately 14 inches long by 1.2 inches deep. Damage region 401 is approximately 5 inches long by 0.23 inches in depth. Damage region 403 is approximately 5 inches long by 0.57 inches in depth.

Figure 5A:
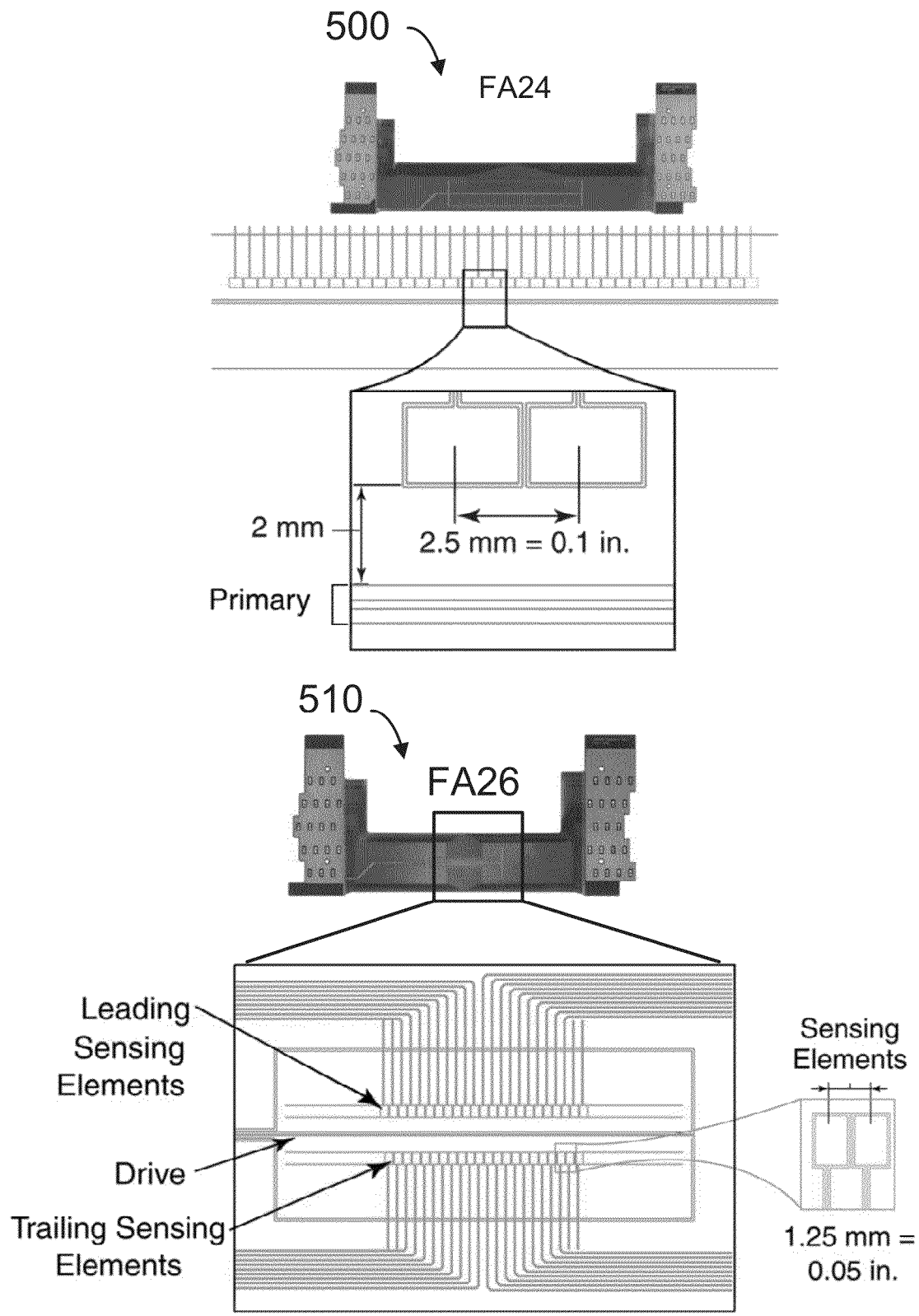
FIGS. 5A-5B illustrates example MWM-Array eddy-current sensors available from JENTEK Sensors, Inc, Waltham, Mass. and operation of a sensor in a scanning configuration according to some embodiments.

Measurements on the damage regions were performed with MWM®-Array eddy-current sensors. Sensor 500, shown in FIG. 5A is an FA24 MWM-Array, one of the sensors used for measurement. Since this MWM-Array has relatively small sense elements, it can create high spatial resolution images but, since the gap between the sense elements and drive conductors is also small, its use is also limited relatively small lift-offs (distance between the sensor and the material). FIG. 3 also shows a photograph of the MWM-Array 500 attached to the probe electronics unit 303 (PEU 303) being scanned with scanning fixture 305 over pipe section 300. By performing a series of parallel scans, wide areas can be imaged—such as an entire pipeline section. It should also be noted that some of the FA24 measurements were performed over a clear plastic sheet with dimensions 2-ft.×2-ft.×0.065-in. The purpose of using the plastic sheet, which was rigid enough to withstand the weight of the scanner and not deform, was to obtain better lift-off calculation (depth) as well as provide a stable plane for the scanner to operate.

Sensor 510, shown in FIG. 5A is an FA26 MWM-Array eddy-current sensor. Sensor 510 has the same drive-to-sense distance as sensor 500 but has higher spatial resolution given that its sense elements are 0.05-in. wide, compared to 0.1-in. for the sense elements of the Sensor 500. The width of the scan path of sensor 510 is almost one-fourth that of sensor 500, —0.95-in. wide compared to 3.75-in. wide for sensor 500. Sensor 510 was used to obtain high resolution scan images for damage regions 401 and 403. Scanning fixture 305 was used with sensor 510 for high resolution imaging of the damage regions.

Figure 5B:
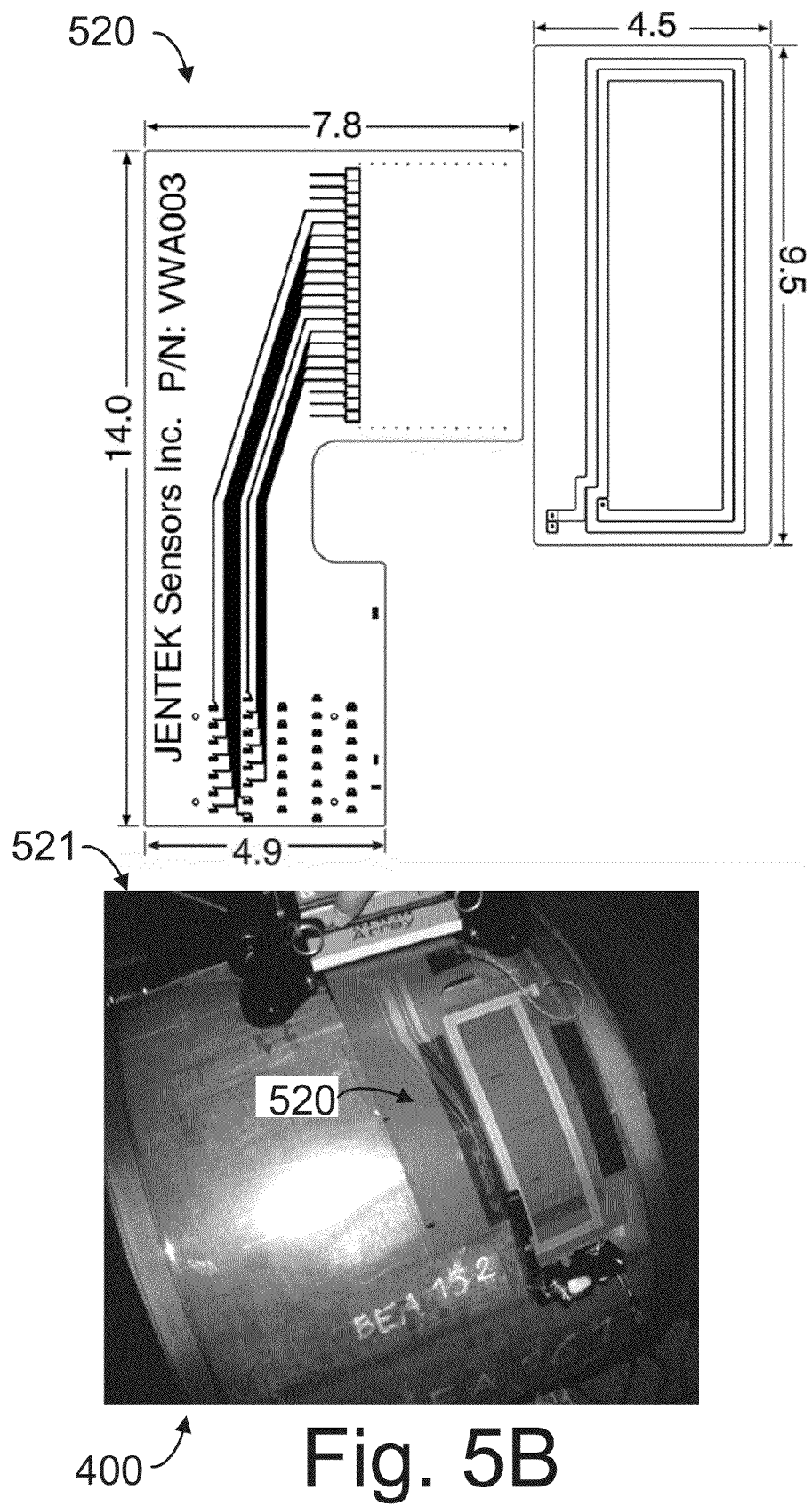

FIG. 5B shows sensor 520 a VWA003 MWM-Array eddy-current sensor. This array has a 9-in. long, 3-in. wide drive winding and a linear array of fifteen sense elements, each sense element being 6.5 mm (0.25-in.) square. This provides a net width of the sense element array of 97.5 mm (3.75-in.). The sense elements are separate from the drive winding so that the distance between the drive winding and the sense elements (the drive-sense gap) can be varied. The most common use of this sensor is to detect external corrosion through coatings. Scanning fixture 521 used to scan the two pipe specimens is shown FIG. 5B.

Damage region 301, was scanned with sensor 500 and sensor 520. An air-shunt calibration was performed. Manual, hand-held scanners were used for the scanning of this defect. Sensor 520 scans were performed with a rigid plastic sheet placed over the damage region and tied down with straps to conform to the pipe curvature. Sensor 500 scans were performed without the rigid plastic sheet so that the sensor could better conform to the mechanical damage area and obtain more accurate permeability measurements. Scanning fixture 305 used for sensor 500 had thick foam backing to allow better conformity with the dent region. Axial scan images of lift-off and permeability with sensor 500 were estimated.

A 9-inch wide region around damage region 301 was designated for scanning using the sensor 520. A 3-in. wide spacing was used, which allowed for a full map of the damage region yet ensuring some channel overlap. The relatively large dimensions for this MWM-Array provide sensitivity to the depth of this damage even though the damage is roughly 1 in. (25.4 mm) deep.

The axial scan images of lift-off and permeability were estimated. The maximum measured lift-off is approximately 0.90 in., whereas the physically measured dent depth was 1.20 in. The reason for the discrepancy is that the databases used for the multivariate inverse method did not corrected for the non-planer layers. The lift-off was a reasonable approximation to the actual geometry for this particular requirements of this specific application.

Figure 6:
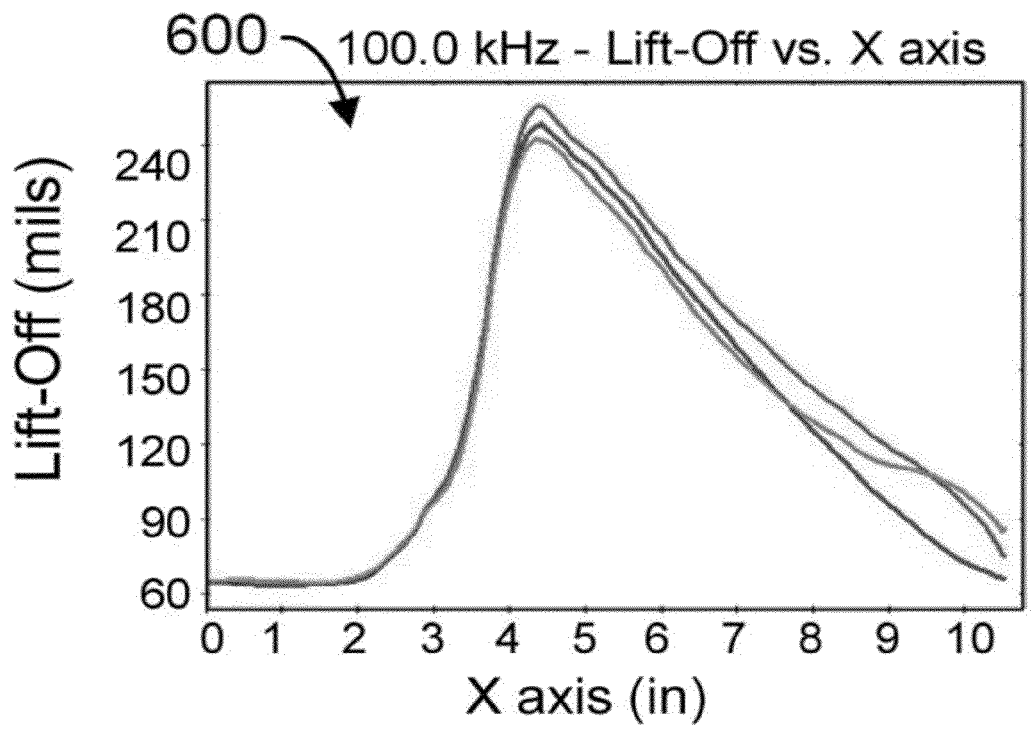
FIG. 6 shows illustrative plots of lift-off and permeability data acquired on a damage region of a pipe section.
Figure 6:
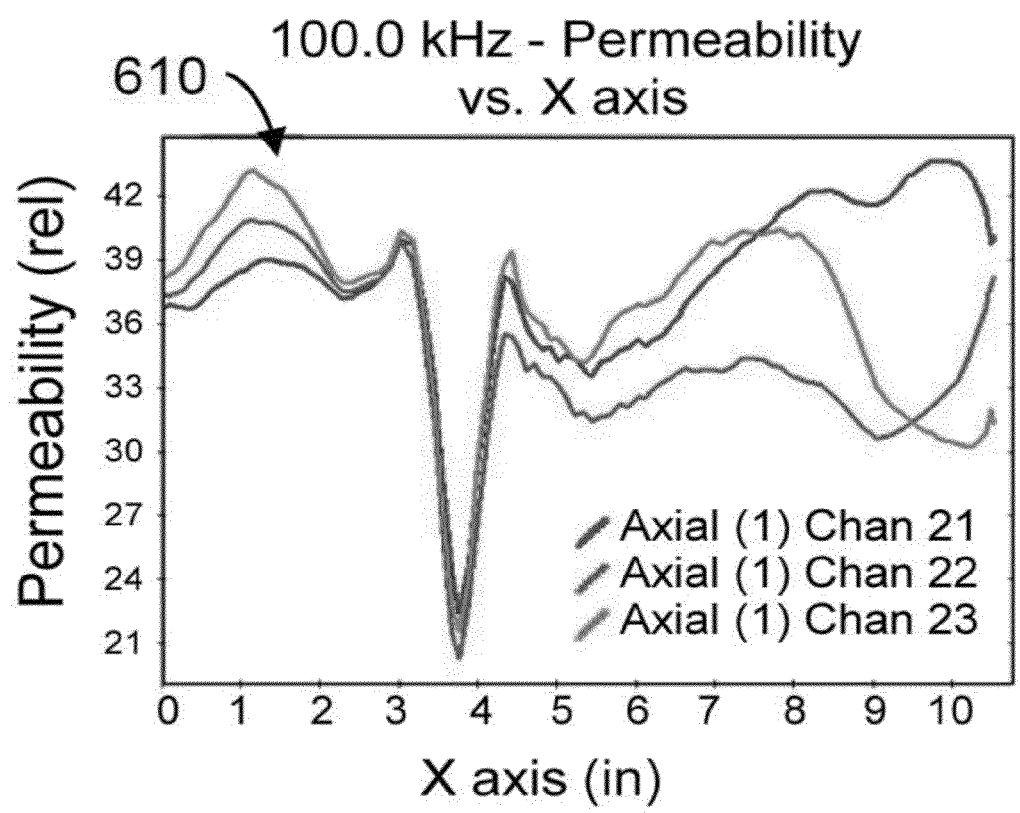

Axial scans were performed using all sensors 500, 510, and 520 on damage region 401 were also taken. Circumferential scans were also performed with sensor 500. Air-shunt calibration was used in all cases. Scans were performed from the wider end of damage region 401 towards the narrower region. The lift-off image provides an accurate representation of the geometry and depth of the damage while the permeability image appears to provide some information about residual stresses in the material. The B-scan plots 600 and 610 in FIG. 6 provide a view of property variations.

The axial lift-off and permeability scan images of the damage region 401 imaged using the sensor 510 are similar to the images obtained with sensor 500 except the spatial resolution is better with sensor 510.

Scans were performed on damage region 401 with sensor 520 in the opposite direction as the scans performed with sensors 500 and 510. By performing scans in the opposite direction, the complete flaw region was mapped.

Damage region 403 was scanned using the sensors 500, 510, and 520. Axial and circumferential scans were performed with sensor 500, whereas only axial scans were performed with sensors 510 and 520. All three sensors were calibrated using an air-shunt calibration.

Scans were performed from the wider end of damage region 403 towards the narrower region. Once again, the lift-off image provides a representation of the geometry and depth of the damage while the permeability image appears to provide some information about the residual stresses. Graph paper lines, with 0.75-in. wide spacing, were drawn on a 0.005-in. thick Mylar shim to act as a guide during scans. Several scans were performed over damage region 403 in 0.75-in, wide increments to create a composite image of the flaw region.

A three-scan axial map of the mechanical damage region 403 was obtained with sensor 520. They were scanned in 3-in. wide increments, covering a region of 9 inches surrounding the damaged region.

Figure 7:
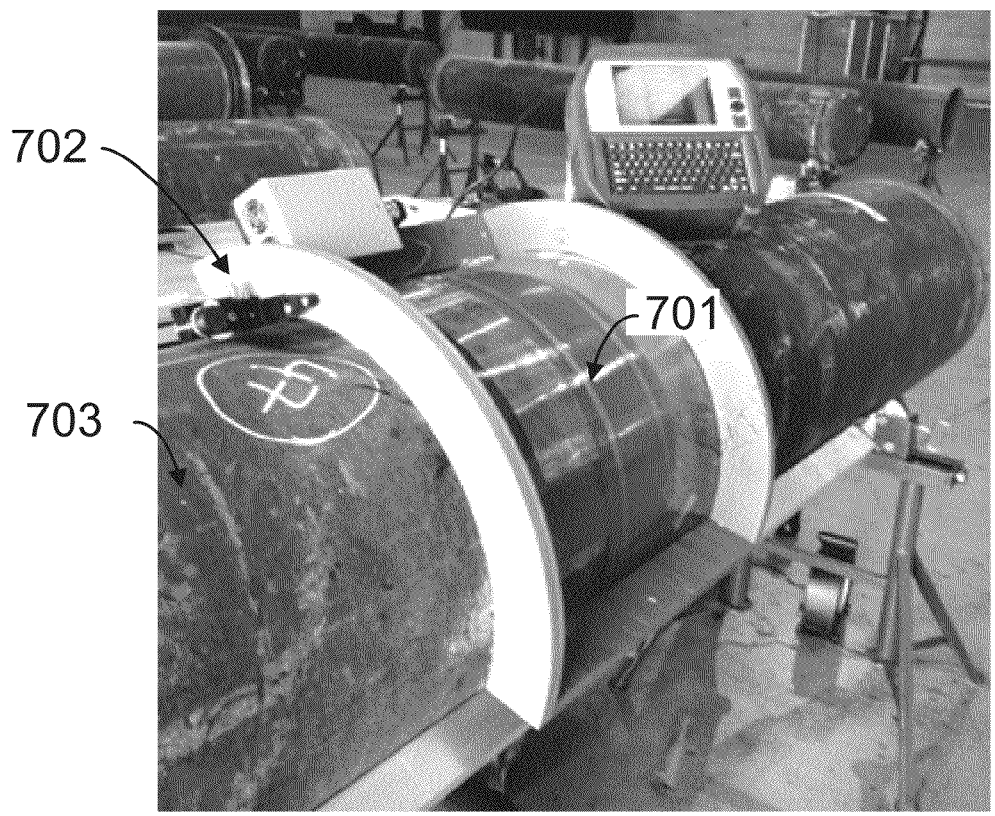
FIG. 7 shows a scanner configuration according to some embodiments.

A series of dent samples were scanned using a VWA001 eddy-current sensor. The VWA001 is a variable wavelength sensor similar to sensor 520 (i.e., VWA003). This sensor features a drive winding that is printed on a separate flexible substrate than the sense elements. This allows the distance between the sense elements and the drive (called the drive-sense gap) to be varied based on the application. FIG. 7 shows a VWA001 sensor 701 mounted to a rigid scanner 702 that matches the curvature of a pipe sample 703. Dent profiles are obtained by combining the lift-off data (the distance between the sensor and the pipe) from multiple scans into an image.

Figure 8:
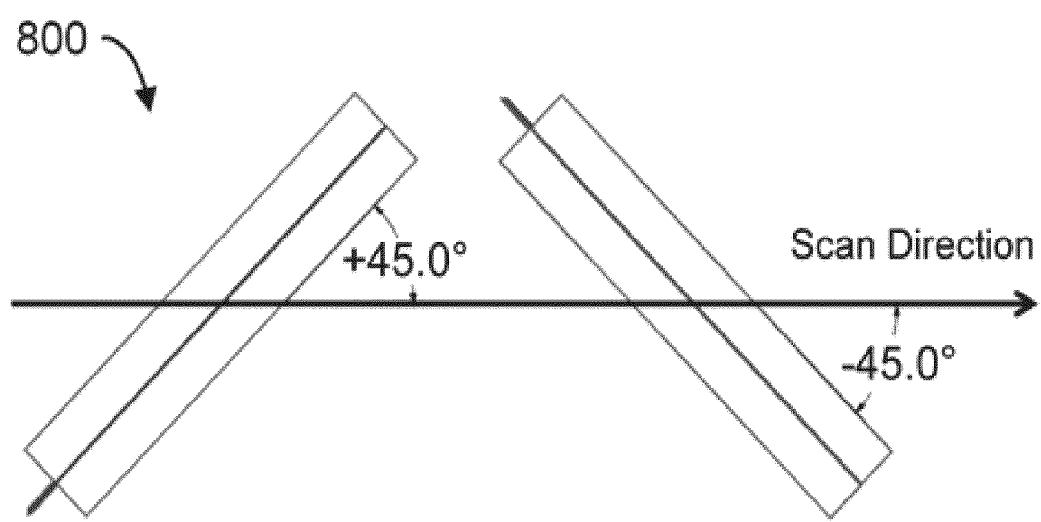
FIG. 8 shows a two orientation scanning approach used in some embodiments.

To detect cracks associated with the mechanical damage sites, the sensor 500 was used, as well as the same scanning fixture that was used for the dent profiles. Since sensor 500 has a linear drive windings, it is most sensitive to cracks that are perpendicular to the drive orientation. In order to maximize the sensor response to a crack, the array was scanned over the dented are twice, once at +45° to the pipe axis and another time at −45° to the pipe axis as shown in sketch 800, FIG. 8.

Figure 9:
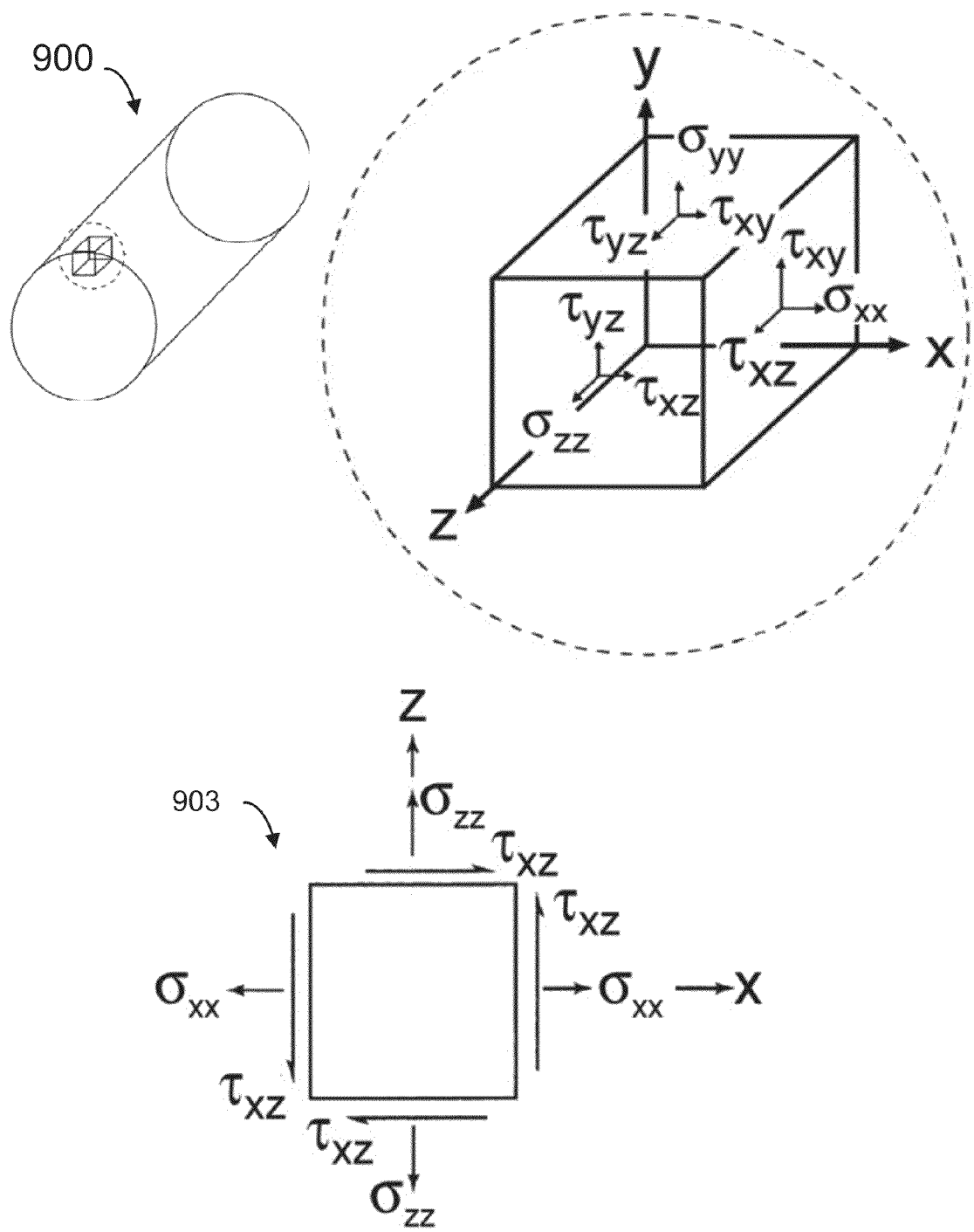
FIG. 9 is a schematic describing a generic state of stress in a material. Surface stress ($\sigma_{XX}$, $\sigma_{YY}$, $\sigma_{ZZ}$) will stretch or compress the material, while shear stresses ($\tau_{XY}$, $\tau_{XZ}$, $\tau_{YZ}$) will cause the material to change shape. Note that the shear stress on each face are not unique (i.e. $\tau_{XY}$ is on the figure twice)
Figure 10:
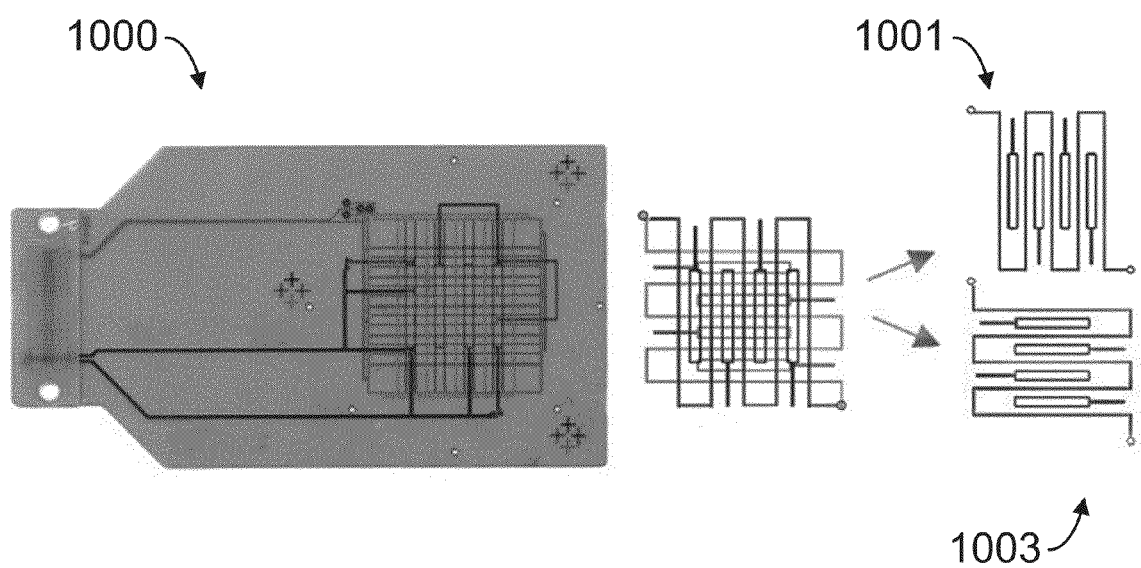
FIG. 10 illustrates an FA160 Bi-Directional Magnetic Stress Gage (BD MSG) available from JENTEK Sensors, Inc, Waltham, Mass. Two directional sensors are stacked in a novel configuration so that they can be driven simultaneously while still providing independent measurements.
Figure 11:
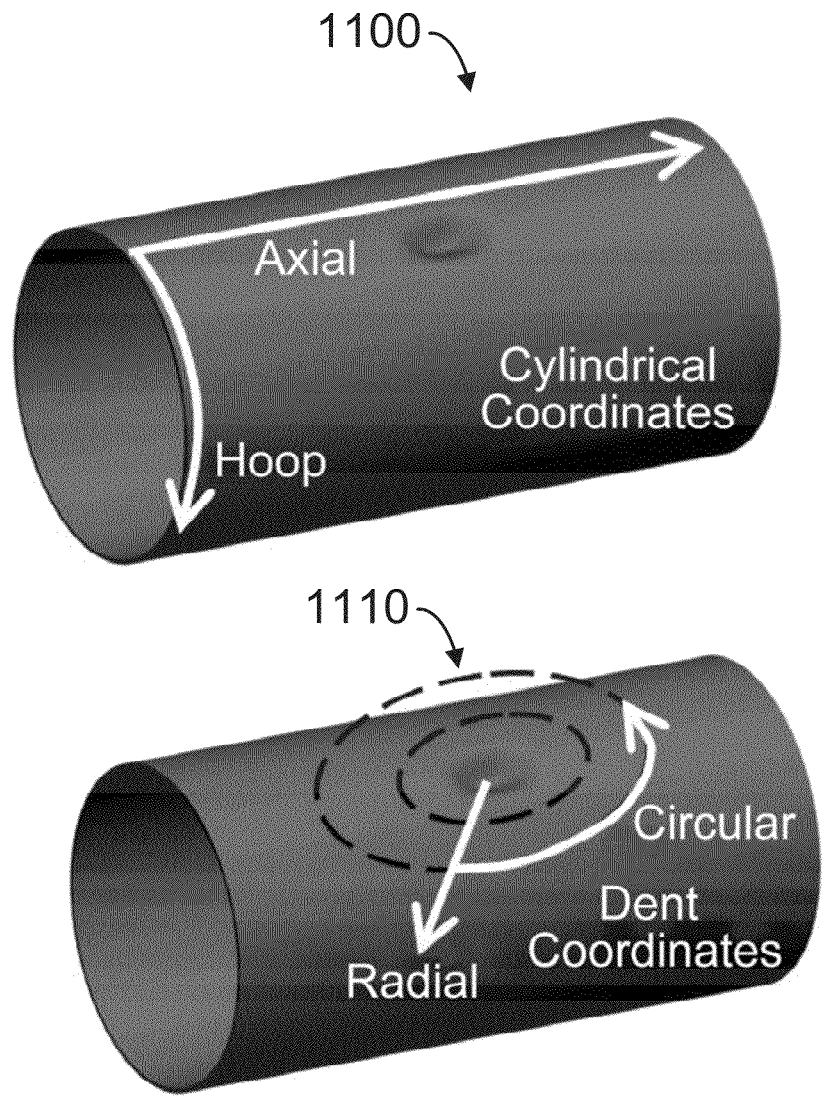
FIG. 11 illustrates the definition of coordinate systems used to describe some aspects.

In general, there are six stress components that are required to fully describe the state of stress at a point in a material as illustrated in sketch 901, FIG. 9. For this demonstration, a quadri-directional magnetic stress gauge (QD-MSG), sensor 1000, FIG. 10, was used at relatively high frequency to evaluate only the surface of the material. Therefore, the sensor response was only sensitive to the surface stresses. In this case, three of the six stress components can be assumed to be zero since there are no stresses acting on the surface of the pipe as summarized in sketch 903, FIG. 9. While the state of stress is only dependent on the applied loads, the values used to express that state of stress are dependent on the coordinate system. Two coordinate systems, coordinate systems 1100 and 1110 are presented with reference to FIG. 11. Coordinate system 1100 is a cylindrical coordinate system aligned with the pipe. While this system makes sense since the pipe is a cylinder, it also makes sense to define coordinate system 1110 centered on the dent itself since it can be easier to interpret the results.

Figure 12:
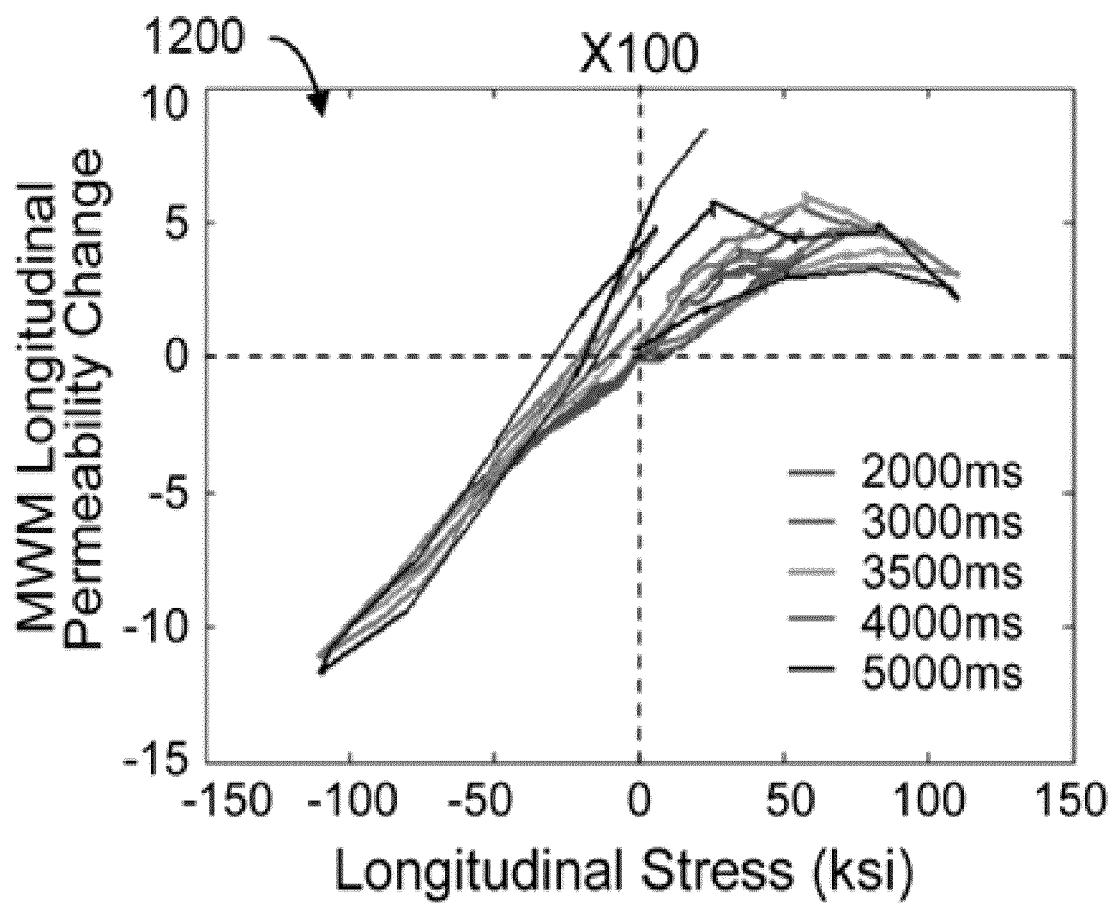
FIG. 12 plots the permeability to stress relationship for an X100 material.

In order to estimates stresses, the relationship between the directional magnetic permeability measured by the sensors and stress must be determined. Plot 1200 in FIG. 12 shows a typical permeability to stress relationship for a pipeline steel. In compression (bottom-left quadrant), the relationship is reasonably linear. In tension (top-right of the figure), the response is non-linear.

Figure 13:
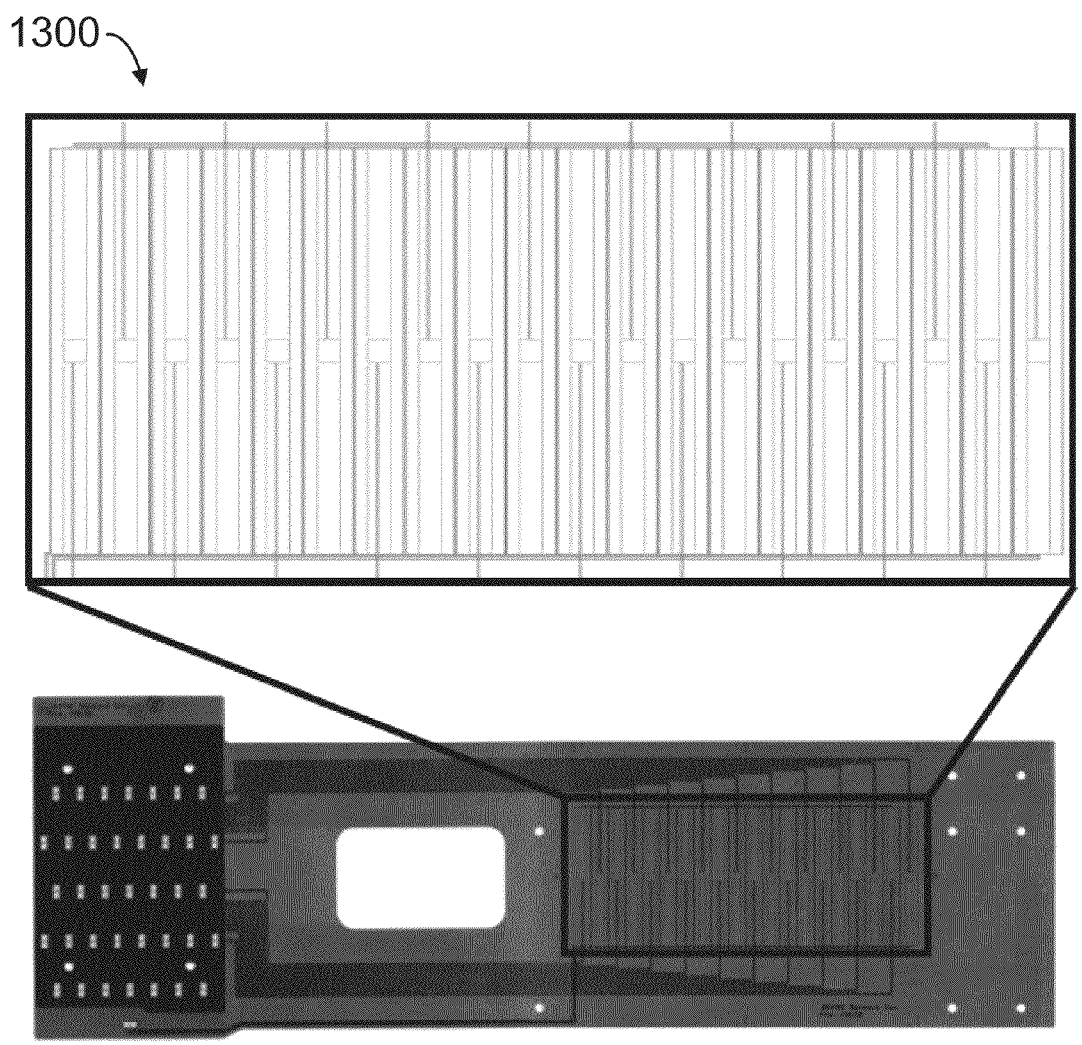
FIG. 13 shows an FA178 MWM-Array sensor available from JENTEK Sensors, Inc.
Figure 14:
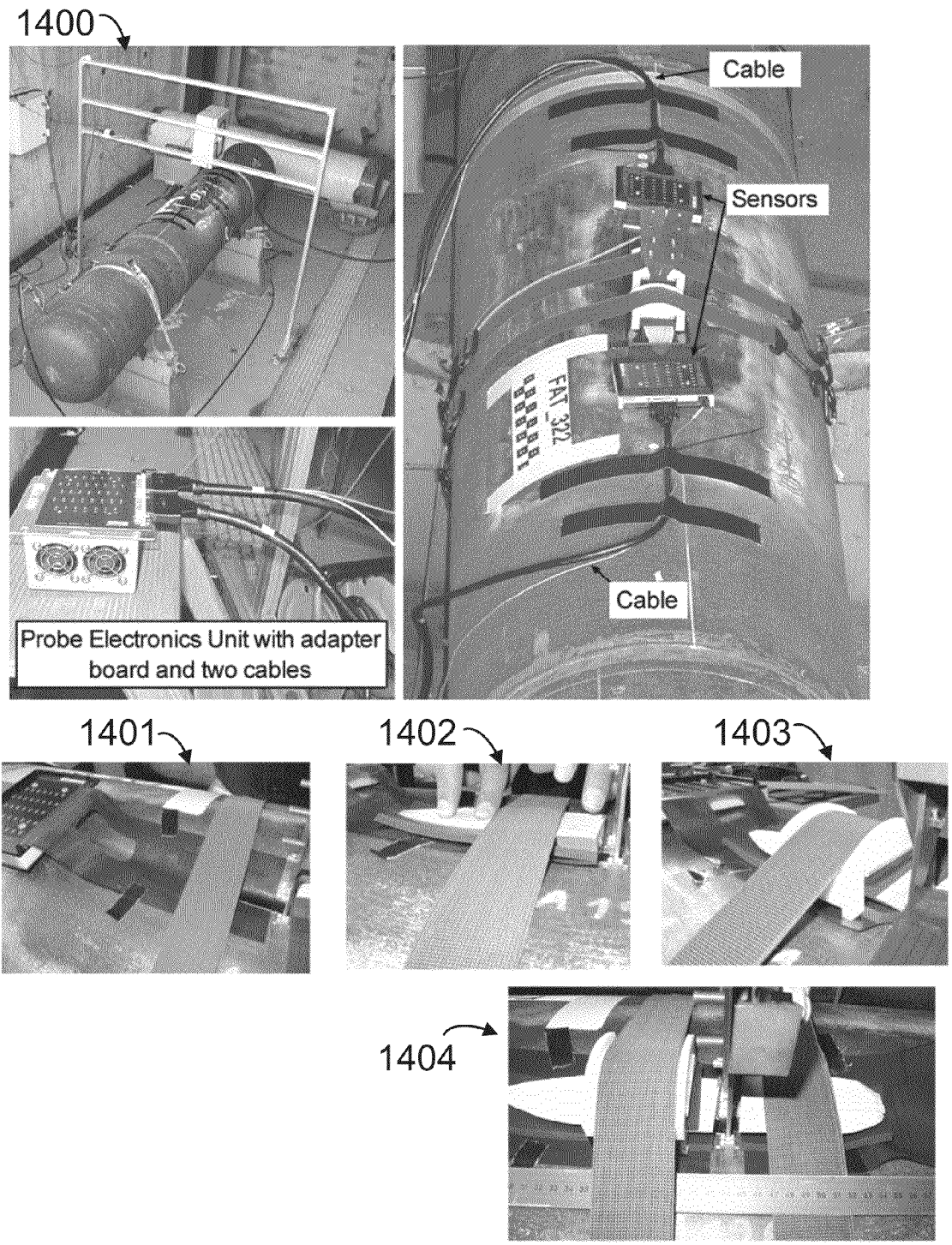
FIG. 14 illustrates the setup of an NDT system for monitoring a gouge in a pipe during pressure cycling according to some embodiments.
Figure 15:
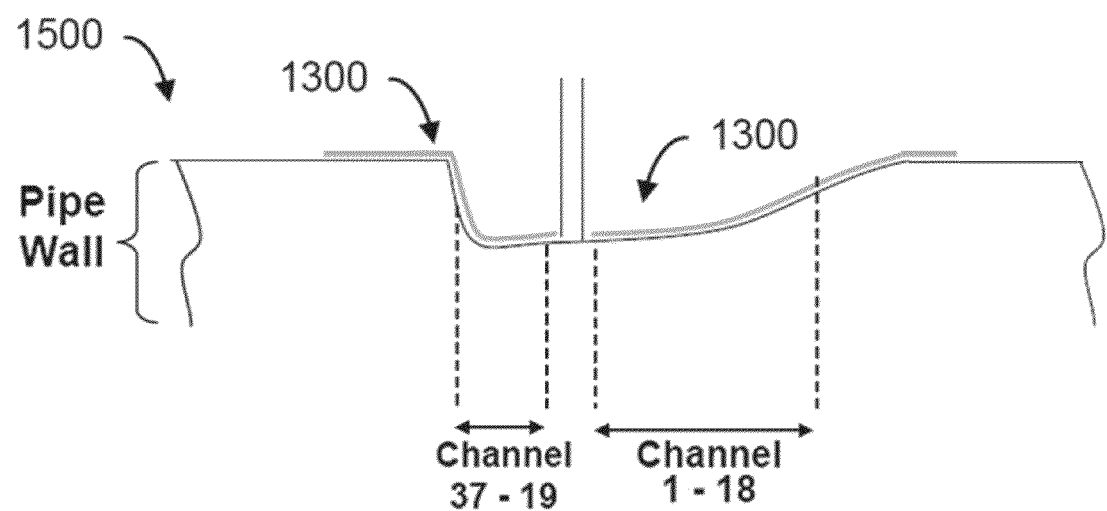
FIG. 15 illustrates sensor placement in the gouge geometry and the corresponding channel location during validation testing.

Sensor 1300, shown in FIG. 13 is an FA178 MWM-Array eddy-current sensor. A gouge in a pipe section was to be monitored during pressure cycling. The pipe and sensor 1300 setup is shown in images 1400-1404 in FIG. 14. A schematic view 1500 is shown in FIG. 15. The entire gouge surface was to be monitored for crack initiation and growth. The FA178 sensor design has 20, 0.25 in. wide sense elements. It was verified that two FA178 sensors would provide the coverage needed for crack detection and growth monitoring during testing.

Figure 16:
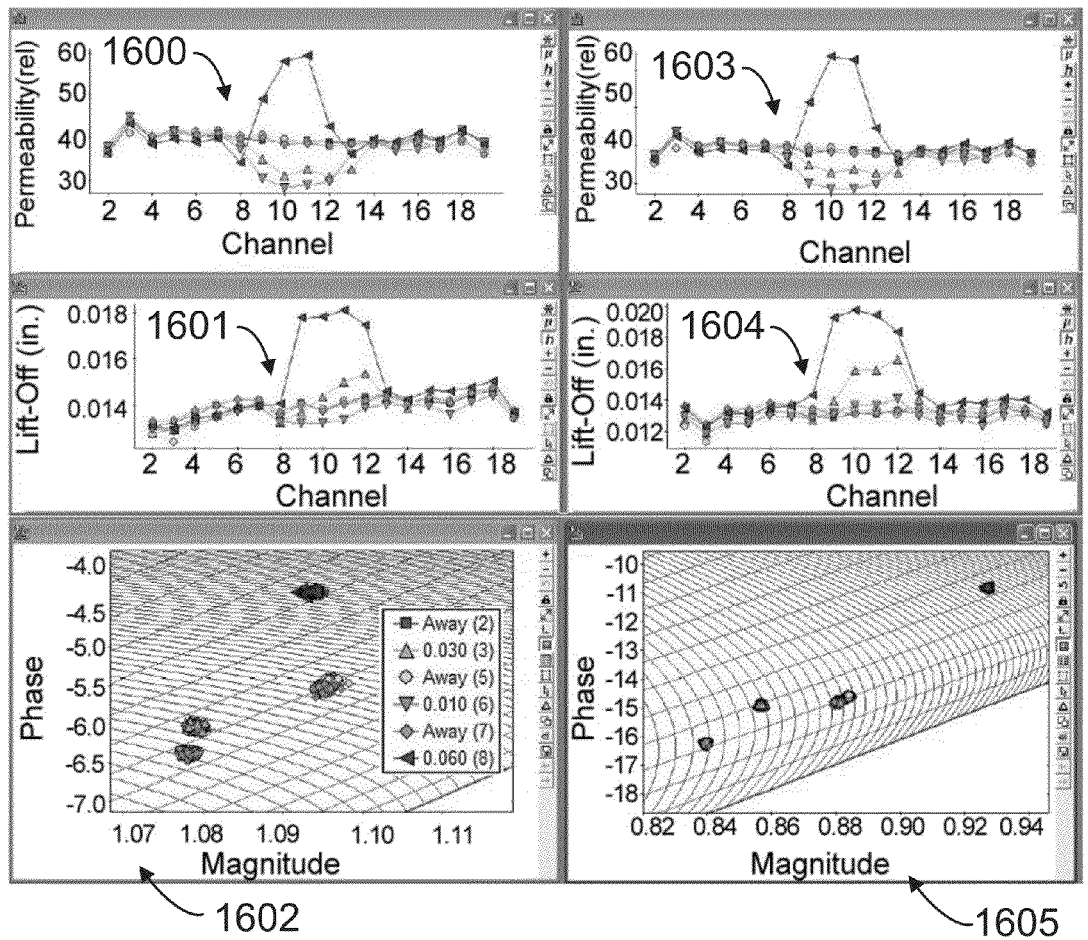
FIG. 16 plots FA178 measurement data on a steel plate with three EDM notches of different depths.

Prior to the testing, measurements on EDM notch samples were performed using sensor 1300. Plots 1600-1606 in FIG. 16 show measurements on a steel plate with three EDM notches. Each EDM notch was approximately 2-in. long and had depths of 0.010 inches (0.25 mm), 0.030 inches (0.76 mm), and 0.060 inches (1.52 mm). The drive winding of sensor 1300 was oriented perpendicular to the length of the notches. The nominal lift-off was about 0.015-in., which included a 0.010-in. shim and the thickness of insulating protective layers on the sensor itself. Measurements were taken both over the notch and at unflawed locations away from the notches at frequencies ranging from 10 kHz to 100 kHz. Only the 10 kHz (plots 1600, 1601, 1602) and 100 kHz (plots 1603, 1604, 1605) are presented.

As shown in FIG. 16, measurement data away from the EDM notches are relatively consistent for each of the channels. At the center of the notch (channel 10), for the 0.010 and 0.030-in. notches, there is a decrease in the effective permeability while for the 0.060-in. deep notch there is an increase in the effective permeability. The effective lift-off always tends to increase with the notch depth. This data demonstrates that the sensor is sensitive to the depth of the EDM notches are the available frequencies.

Figure 17:
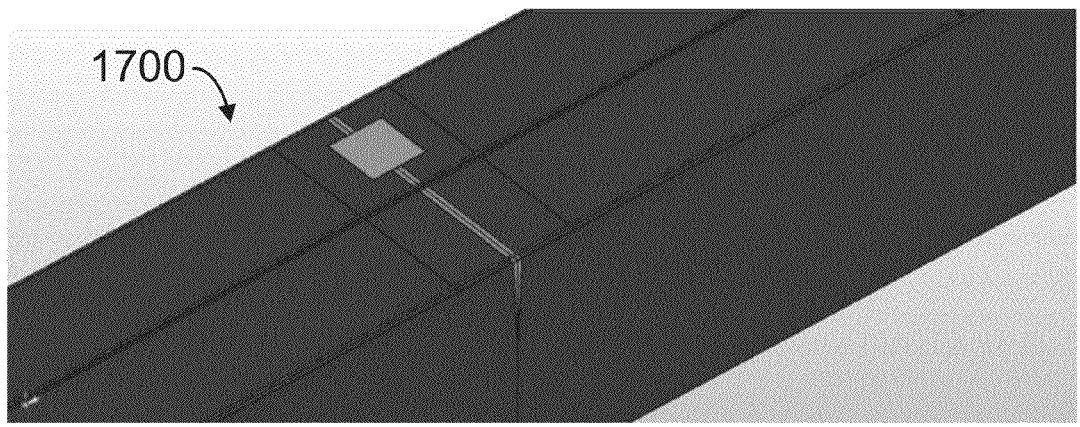
FIG. 17 illustrates an FEM model geometry used for validation.
Figure 17:
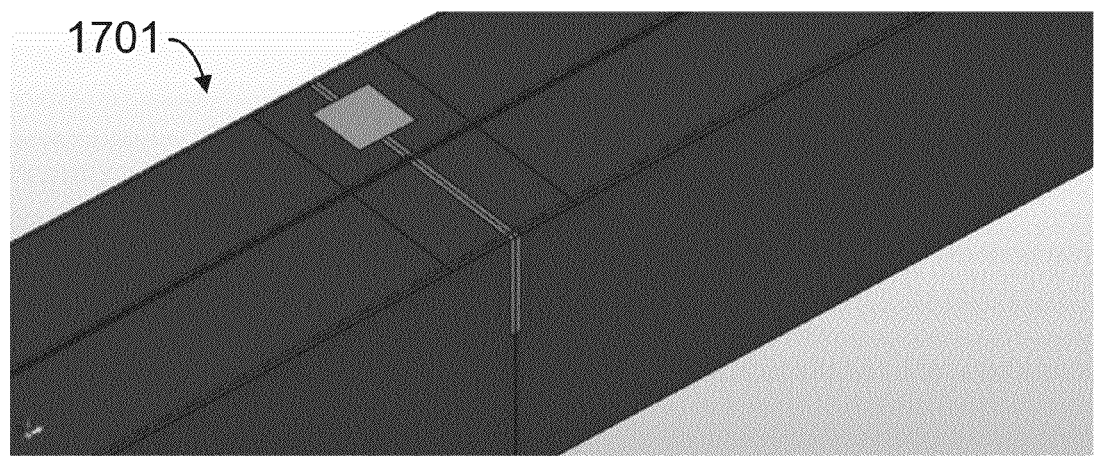

Finite element method (FEM) analysis was used to predict the sensor response to cracks of varying depth and width (crack opening) during the fatigue test. FEM model geometry 1700 is shown in FIG. 17. Since the model is periodic, only two of the half-periods needed to be modeled. The sensor response was subsequently processed using appropriate permeability/lift-off measurement grids for the FA178 that were generated with a standard 2D model.

Figure 18:
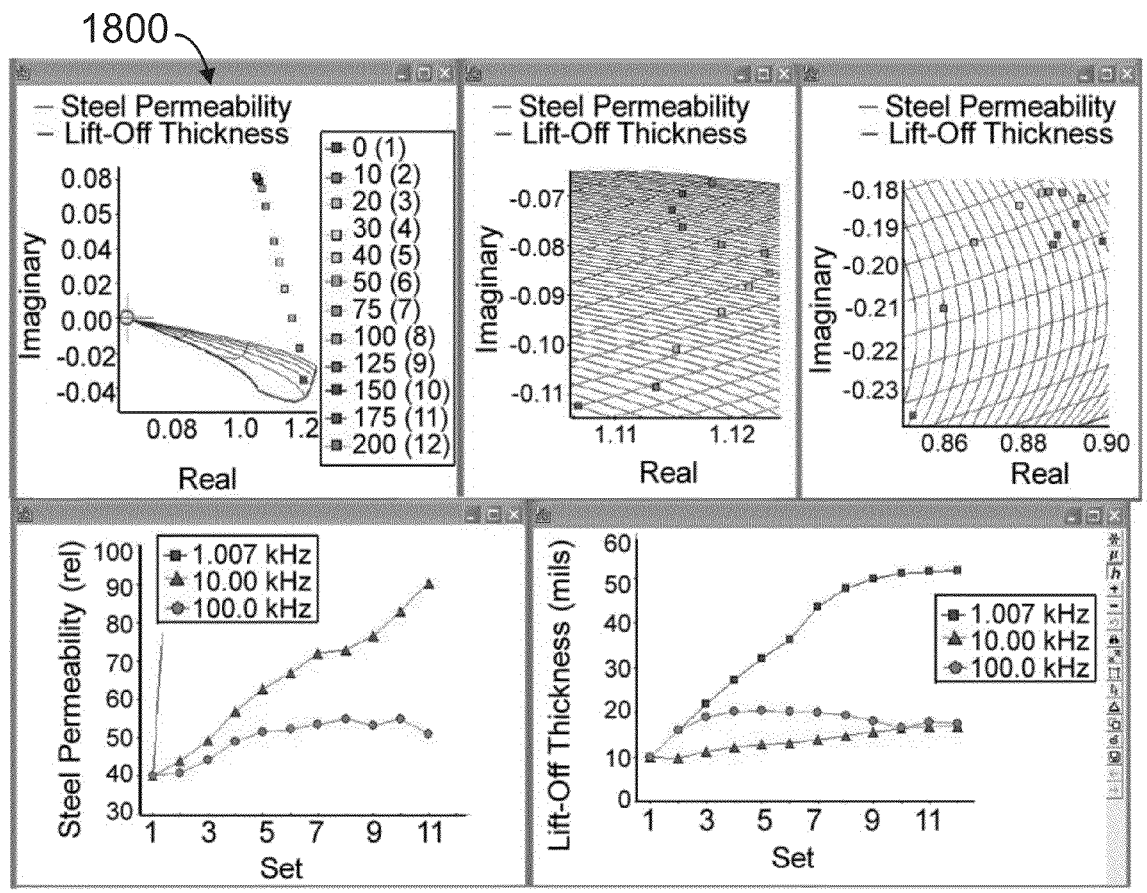
FIGS. 18-20 illustrates FEM validation results.
Figure 19:
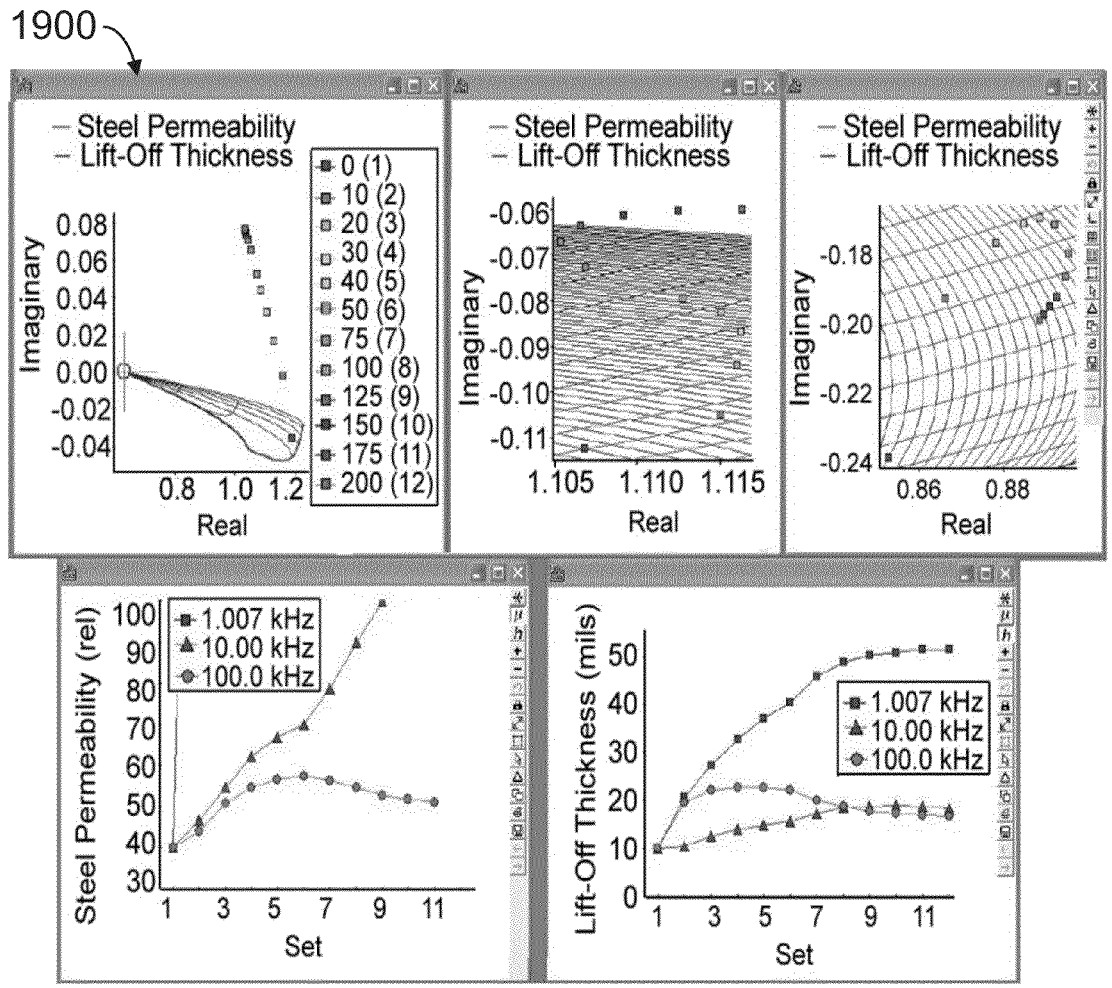

Plots 1800, in FIG. 18 show the predicted change in sense element response for several frequencies as the depth of the notch is varied. At 1 kHz, for very shallow notch depths, the response is off of the measurement grid. At 10 kHz, the permeability and lift-off both continue to increase even for a depth up to 0.200-in. At 100 kHz, the permeability and lift-off reach limiting values for depths near 0.050-in. and there is reduced sensitivity to deeper notch depths. It is worth noting that the increase in permeability and lift-off at 10 kHz and 100 kHz for deep notches is consistent with the responses measured on the EDM notches.

The same type of analysis was applied to a notch having a rectangular cross-section as shown in FEM model geometry 1701 (FIG. 17). Plots 1900, FIG. shows the results. The behavior is generally similar to the responses observed for the triangular notch.

Figure 20:
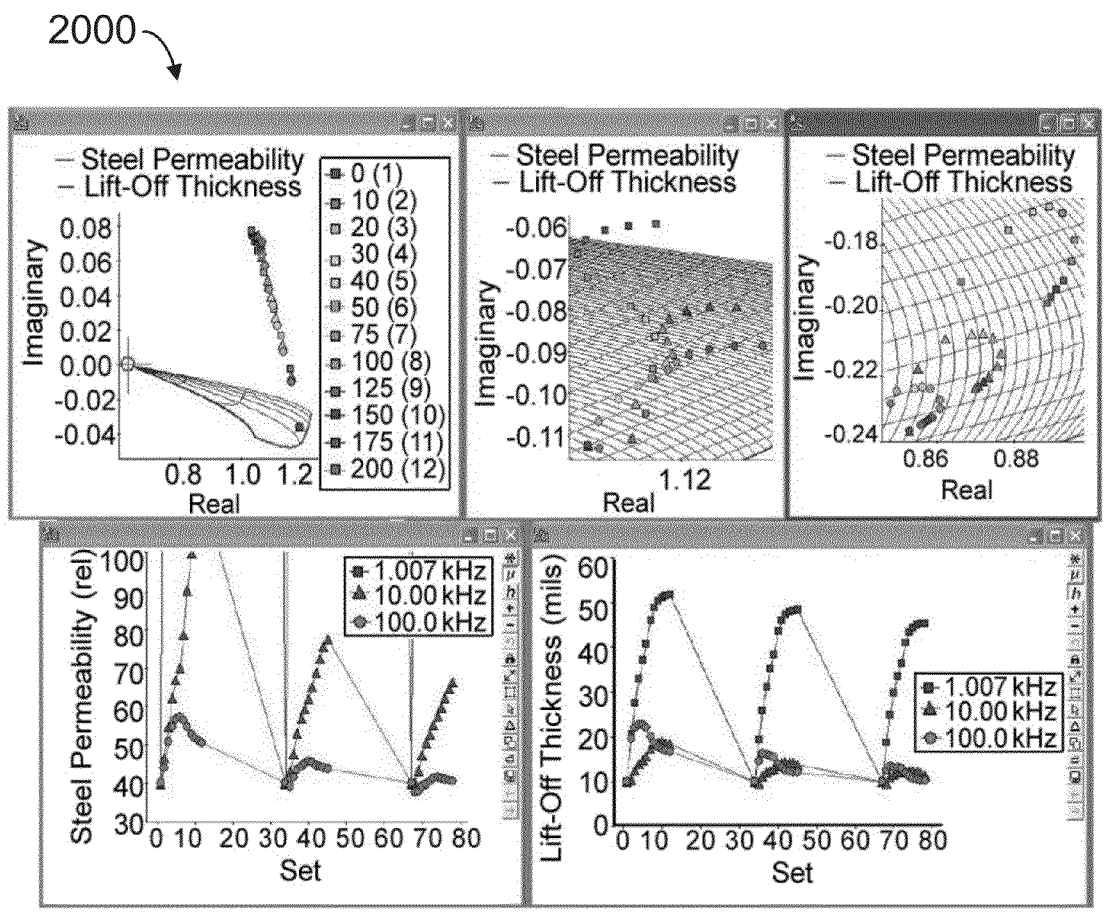

Plots 2000, FIG. 20, show the effect of varying the notch width. At 100 kHz, the response is very sensitive to the width of the notch. At 1 kHz, the response much less sensitive to the width of the notch.

Figure 21:
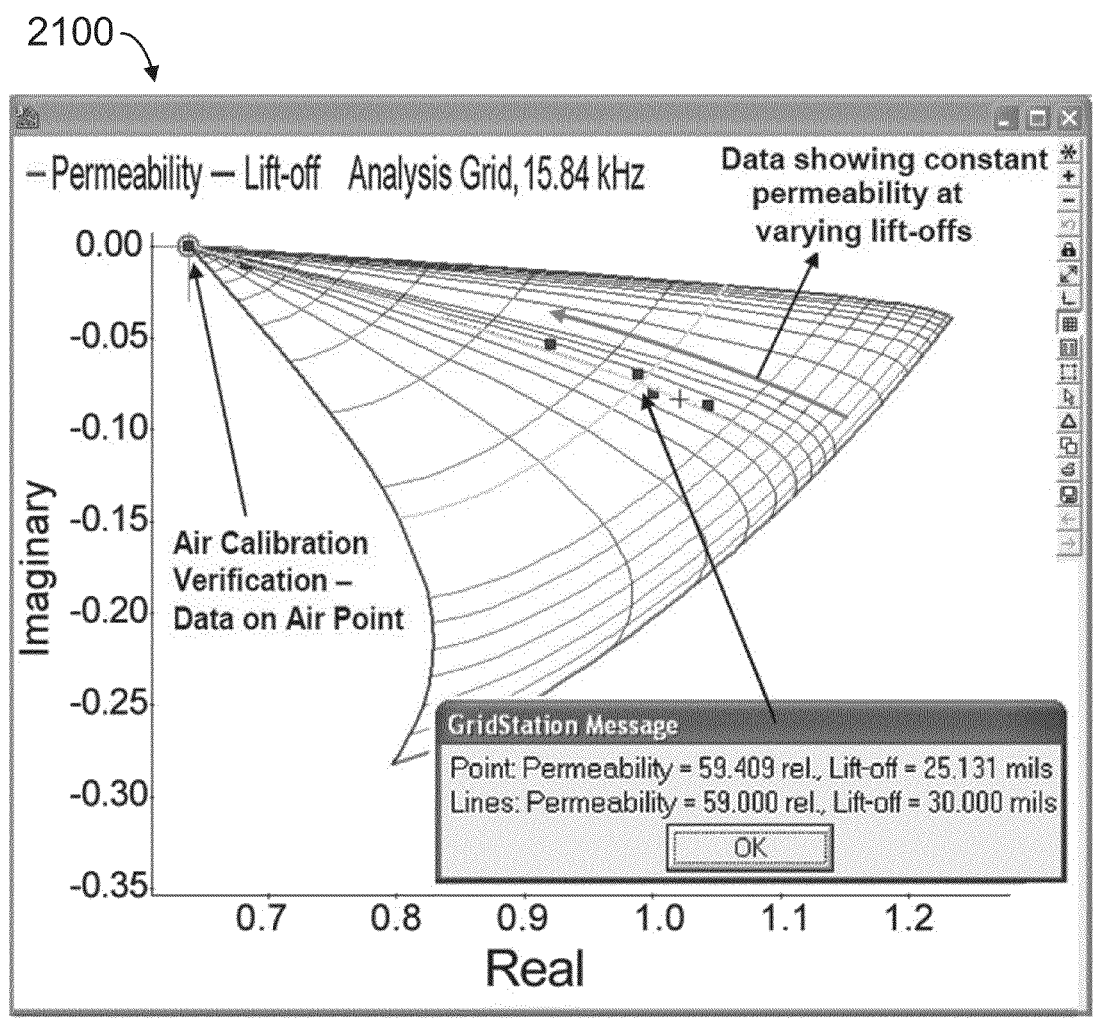
FIG. 21 plots calibration verification data on a measurement grid. This data was collected to verify that the sensors were reliably measuring lift-off (proximity of the sensor from the pipe surface) and permeability under no-load conditions.

For testing, the pipe section with a 12-inch gouge, shown in images 1400, was subjected to variation of internal pressure between 20 bar (minimum pressure) and 60 bar (maximum pressure). The pipe sample was 24-inch diameter with a wall thickness of approximately 0.311 in.-0.354 in. The FA178 sensors were calibrated in air. A series of verification tests were performed, before and after the sensor was installed on the pipe sample, to ensure the sensors were properly mounted and that the data was reliable. Plot 2100, FIG. 21, shows a series of performance verification data on the grid. First, measurements were taken in air. Next, measurements were taken on the pipe sample (away from the gouge) with different insulating shims between the sensor and the pipe. The purpose of this test is to verify that the sensor will measure reasonable values for the lift-off and magnetic permeability of the pipe, and that the measurement grid will properly compensate for changes in the distance between the sensor and the material (lift-off). Note that this is not a calibration step—it is a verification of the air calibration to confirm that the system is operating properly.

After the sensors were calibrated in air, they were mounted on the pipe sample with the sensors conforming to surface of the gouge. Images 1400-1404, FIG. 14, show the actual setup. The pipe sample was in a covered, underground pit. The impedance instrumentation was connected to the probe electronics unit using a 30-foot probe extension cable.

Plots 1401-1404 illustrate the process of permanently-mounting the two FA178 sensors on either side of a clip gauge used to monitor the opening of the crack. The sensors were taped down to the gouge region, on either side of the clip gauge, to prevent the sensors from moving from their desired location during installation. The location of the sensor was marked on the pipe surface to ensure that the sensor could be readjusted to its original location if it needed to be removed during testing. Two wooden wedges were carved to match the gouge geometry. Foam was applied between the sensors and the wedges to ensure that the sensor maintained proximity to the gouge surface during testing. Two plastic support blocks were designed to hold the wooden wedges and foam in place. These supports were held in place using elastic straps. This mounting system was designed to allow the pipe to change shape during loading (including rerounding) without significantly affecting the pressure being applied to the sensor. Schematic view 1500, FIG. 15, show the sensor placement in the gouge region.

Figure 22:
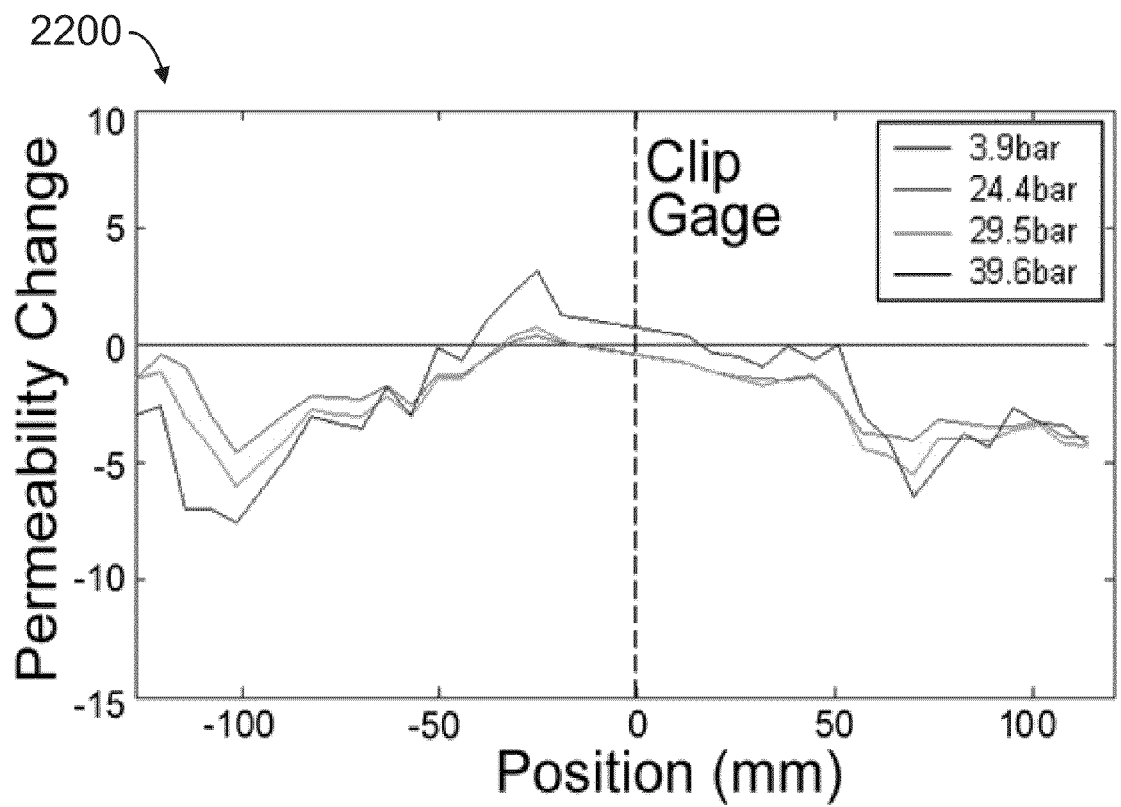
FIG. 22 plots permeability change as a function of position at various pressures during validation testing. The data was acquired at static pressures and the pipe was pressure cycled 5 times between static measurements. The change in permeability is due to the distribution of stress in the gouge. Note that the clip gage is placed at the 0 mm position.

Before commencing the full-scale pressure testing, the internal pressure of the test sample was gradually increased to 60 bars in a series of steps so that the MWM-Array sensor performance could be monitored. Plot 2200, FIG. 22, shows the MWM-Array data at 3.9 bar, 24.4 bar, 29.5 bar, and 39.6 bar. Each data set was taken at constant pressure. Between sets, the pressure was cycled 5 times. Table 1 summarizes the static pressure values and the corresponding minimum and maximum pressures achieved during cycling. The variation in Plot 2200 is due to the differences in the stresses at different points in the gouge as pressure is applied.

TABLE 1

| Static Pressure | Minimum Cycle Pressure (Approximate) | Maximum Cycle Pressure (Approximate) |
|---|---|---|
| 3.9bar | N/A | N/A |
| 24.4bar | 20bar | 30bar |
| 29.5bar | 20bar | 40bar |
| 39.6bar | 20bar | 60bar |

Following this initial loading procedure, the pipe was subjected to continuous loading cycles from 20 bar to 60 bar. During testing, the impedance instrumentation would periodically take 3 cycles worth of data. 650 pressure cycles were completed at the end of the first day of testing. Analysis of the data collected during the first day showed that cracks had already initiated and grown beyond the expected limits for the test.

On the second day, it was verified that the clip gauge response corroborated the sensor analysis. The MWM-Arrays were removed to capture images of the gouge region at varying static pressures. The images confirmed the presence of multiple cracks at the bottom of the gouge. The MWM Arrays were re-assembled into the gouge. 25 additional pressure cycles were performed and the MWM Array sensors were again removed so that images could be taken under load. Based on the crack images, the clip gage data, and the MWM-Array measurements, the test was stopped.

Figure 23:
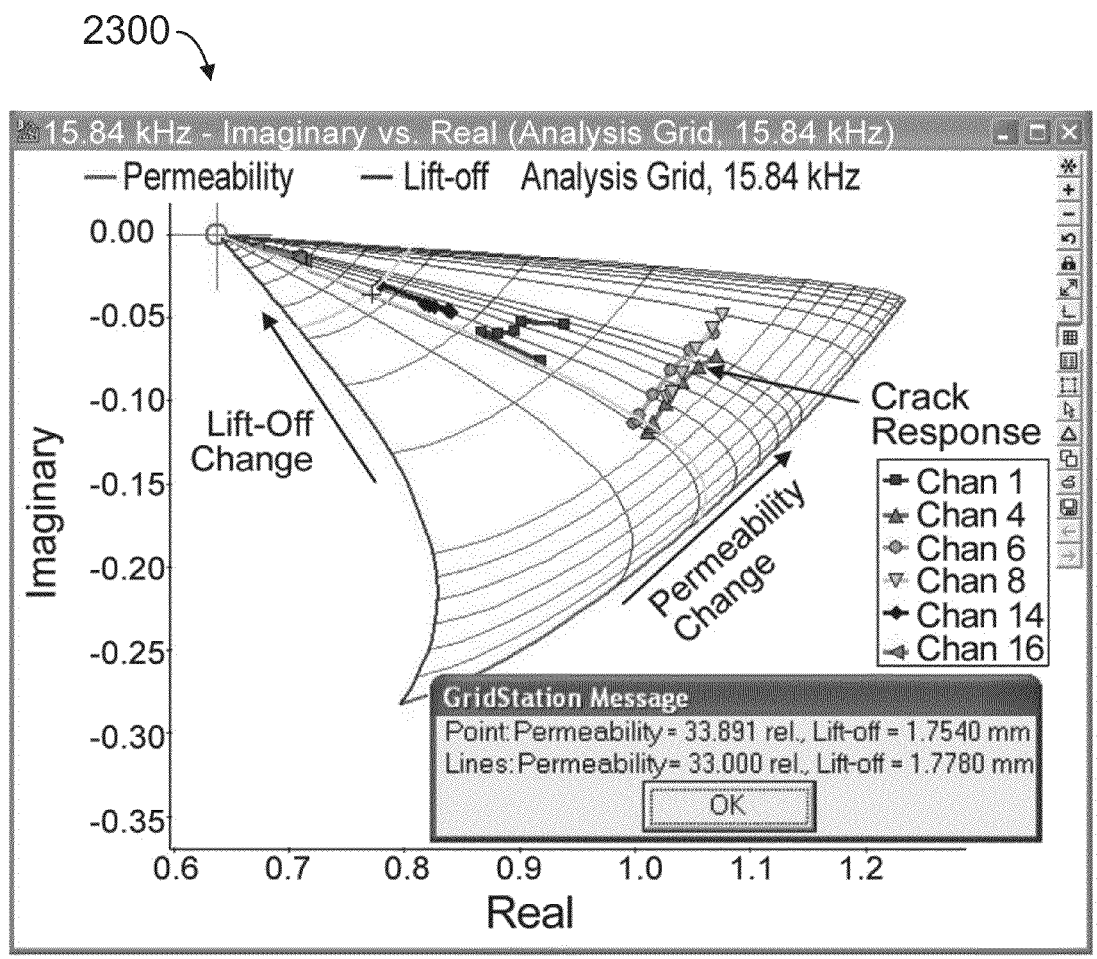
FIG. 23 plots data taken during validation testing on a multivariate inverse method measurement grid database.

Plot 2300, FIG. 23, shows the impedance measurements on a measurement grid. Channels 4, 6, and 8 were over the region where crack initiation occurred, whereas Channels 1, 14 and 16 were over a region away from the cracks. As can be seen in the grid image, a change in permeability was detected by those channels where the crack initiation occurred. The channels that were positioned away from the crack initiation location did not measure any changes in permeability. The change in lift-off could be due to the sensor movement near the edges of the gouge due to the vertical displacement of the pipe during cycling.

Figure 24:
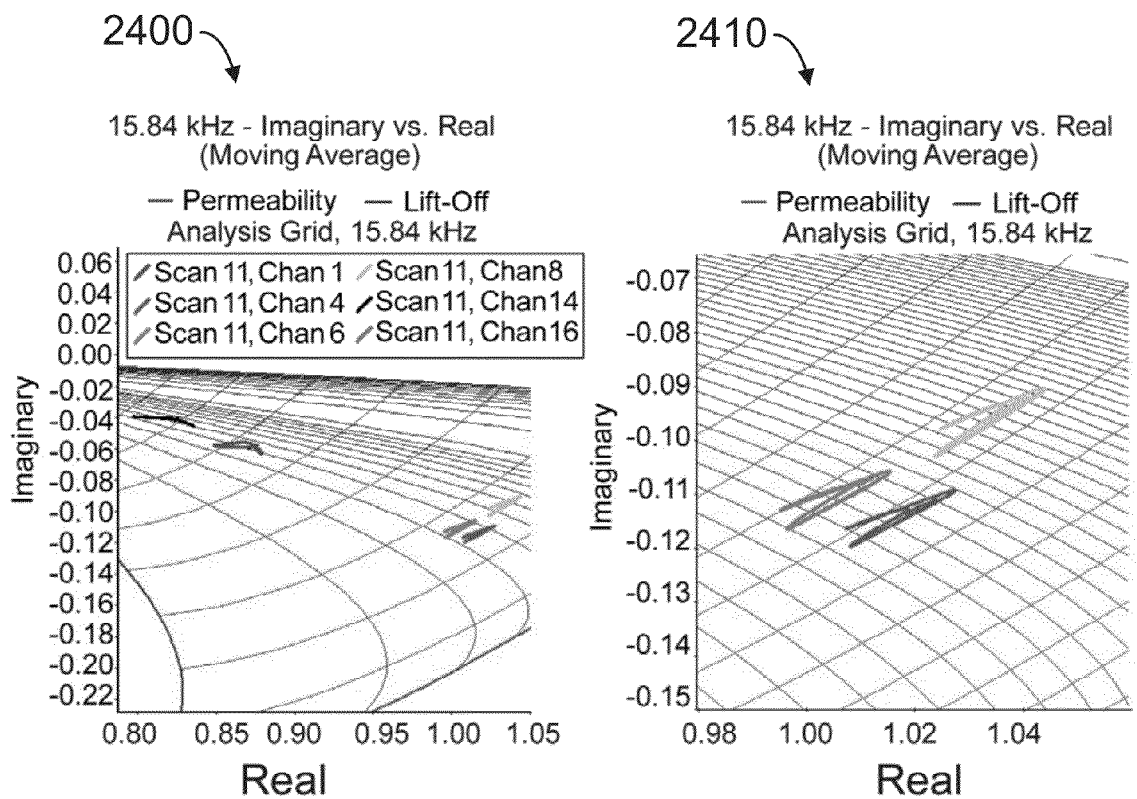
FIG. 24 plots pressure cycle data on the grid showing changes in permeability with change in loads.

Plots 2400 and 2410, FIG. 24, show the change in the sensor response with changes in load taken during three pressure cycles, for channels on the cracks (Channels 4, 6 and 8) and away from the crack (Channels 1, 14 and 16). This illustrates that the predicted models were accurate and the sensor response to change in load was consistent with the observed change in permeability.

Plot 2500, FIG. 25, shows the changes in permeability over one loading cycle. For some channels, a relatively linear correlation between the magnetic permeability and stress is observed. For other channels, the effect was not linear. As the stresses increase, the permeability drops again which is consistent with the permeability versus stress data shown in Plot 2510.

Figure 26:
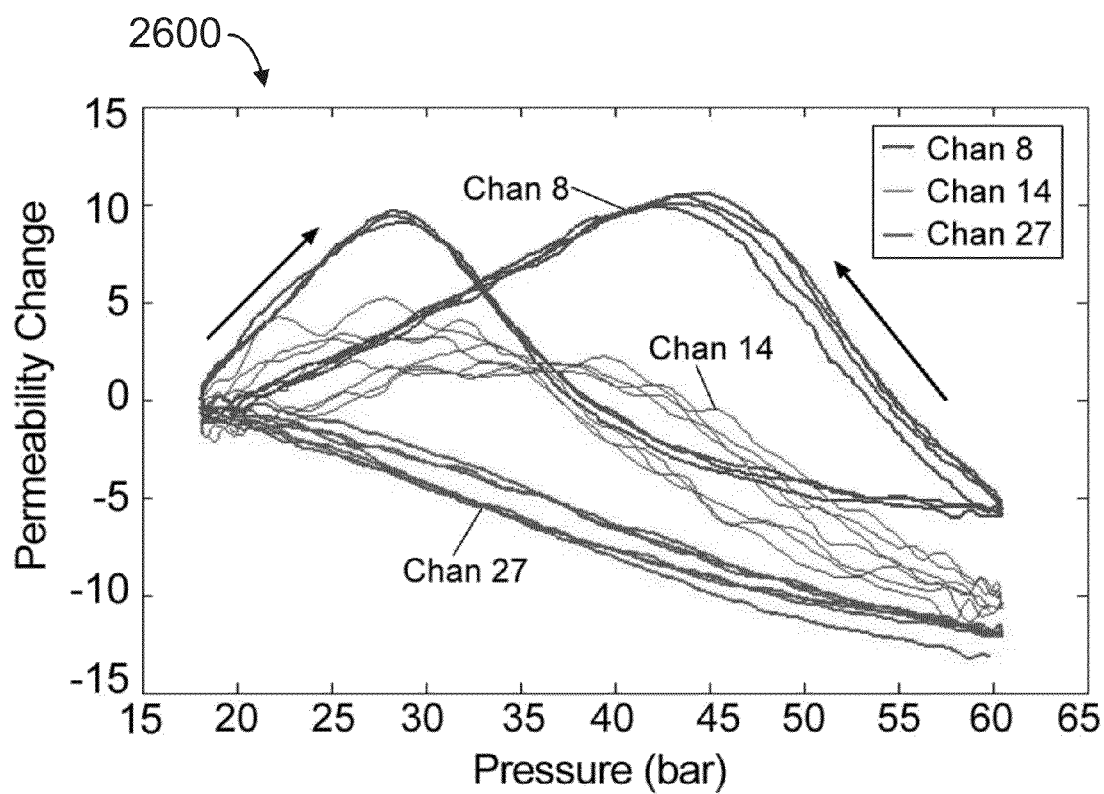

Plot 2600, FIG. 26, shows that, for some channels (such as Channel 27), permeability drops with additional pressure, which is consistent for a location that is in tension at over 50% of the yield strength. For other channels (such as Channel 14), the permeability rises for low loads, then drops at higher loads, which is consistent with a material in tension, but at lower loads stress levels near 50% of yield. Some channels (such as Channel 8) have a permeability to pressure (not stress) relationship that is hysteric, so the permeability to pressure relationship is different depending on if the pipe is being loaded or unloaded. This is consistent with a temporary rerounding where the pipe will alternate between two different geometries depending on the load state.

Figure 27:
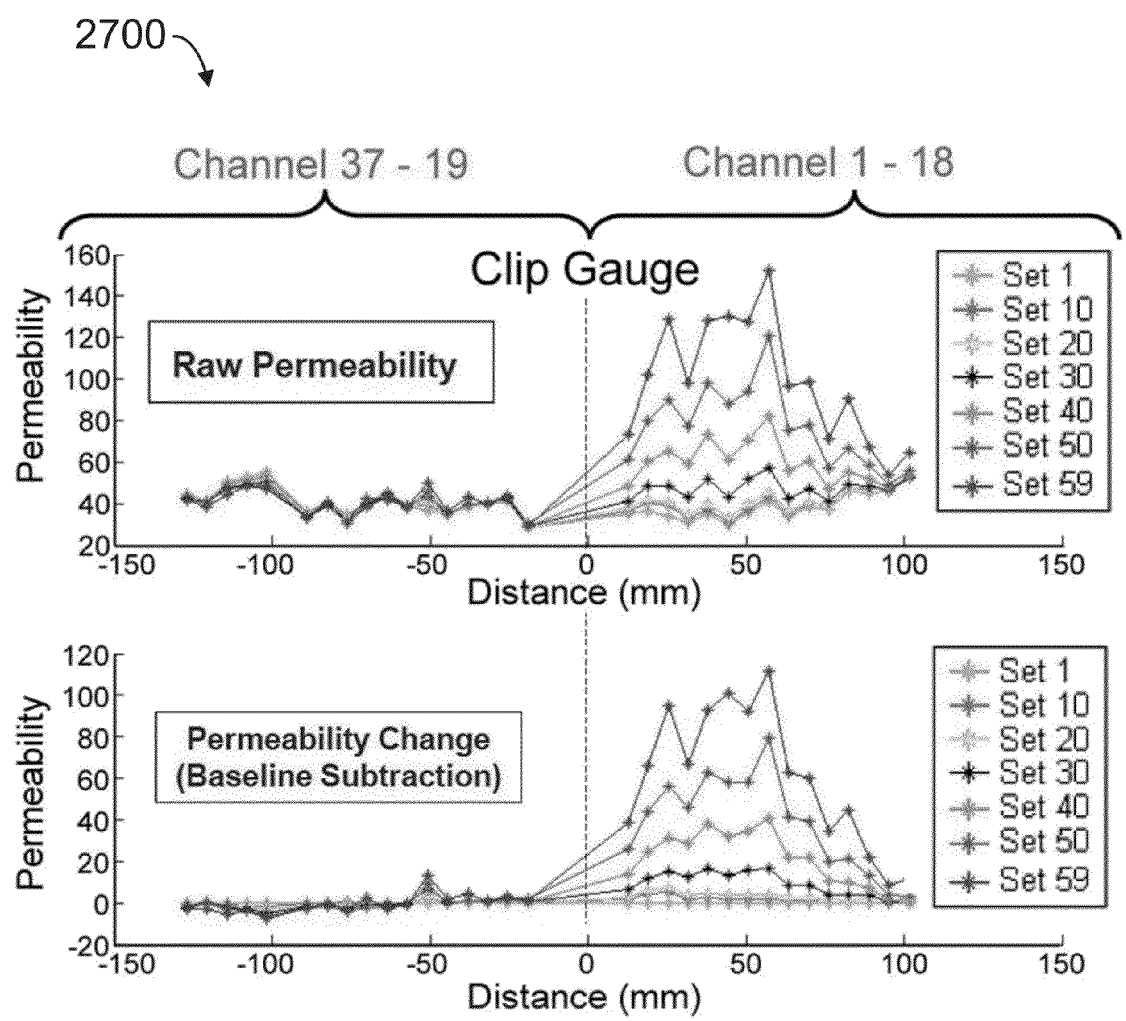

Plots 2700, FIG. 27, show how the permeability changes measured by the two MWM-Arrays sensors, on either side of the clip gauge. For clarity, only 7 data sets (evenly spaced over the duration of the test) are shown out of the 59 data sets collected. The top plot shows the permeability response; the bottom plot shows the permeability change after performing post-processing baseline subtraction. This clearly shows the ability of the MWM-Array sensors to reliably detect the crack initiation and monitor the growth. The FA178 sensor to the right of the clip gauge (Channel 1-18) detected the cracks, as evident by the large permeability change. The sensor on the left of the clip gauge (Channel 37-19) measured a steady permeability value since no crack formations occurred in that region. The exception is at −50 mm from the clip gage where a small crack may have been forming.

Figure 28:
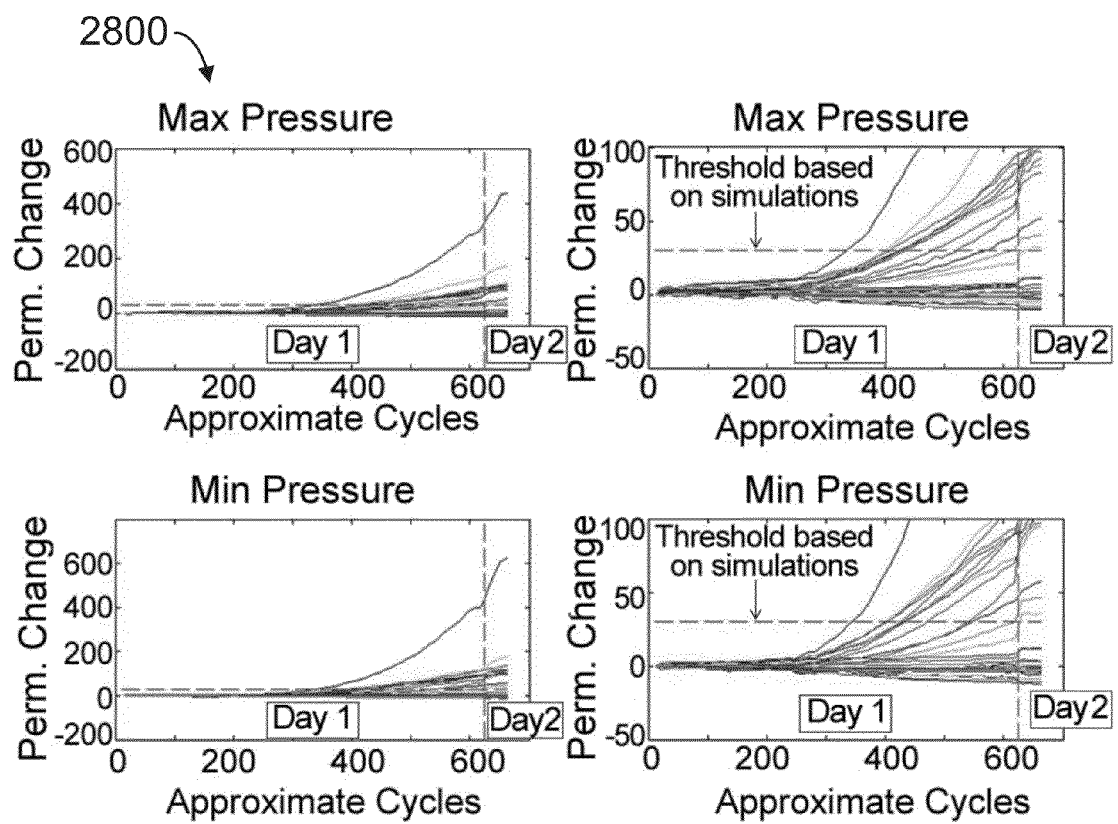

Plots 2800, FIG. 28, show the permeability change during the pressure test (up to 675 cycles). The plots on the top row show the permeability data at maximum pressure (60 bars); the plots on the bottom row are the permeability data at minimum pressure (20 bars). The red dotted line is the permeability change threshold of approximately 30 relative permeability based on the simulations performed prior to the full scale testing. Plots 2800 clearly shows that, based on this threshold, it would have been possible to stop the test earlier with much smaller cracks.

Figure 29:
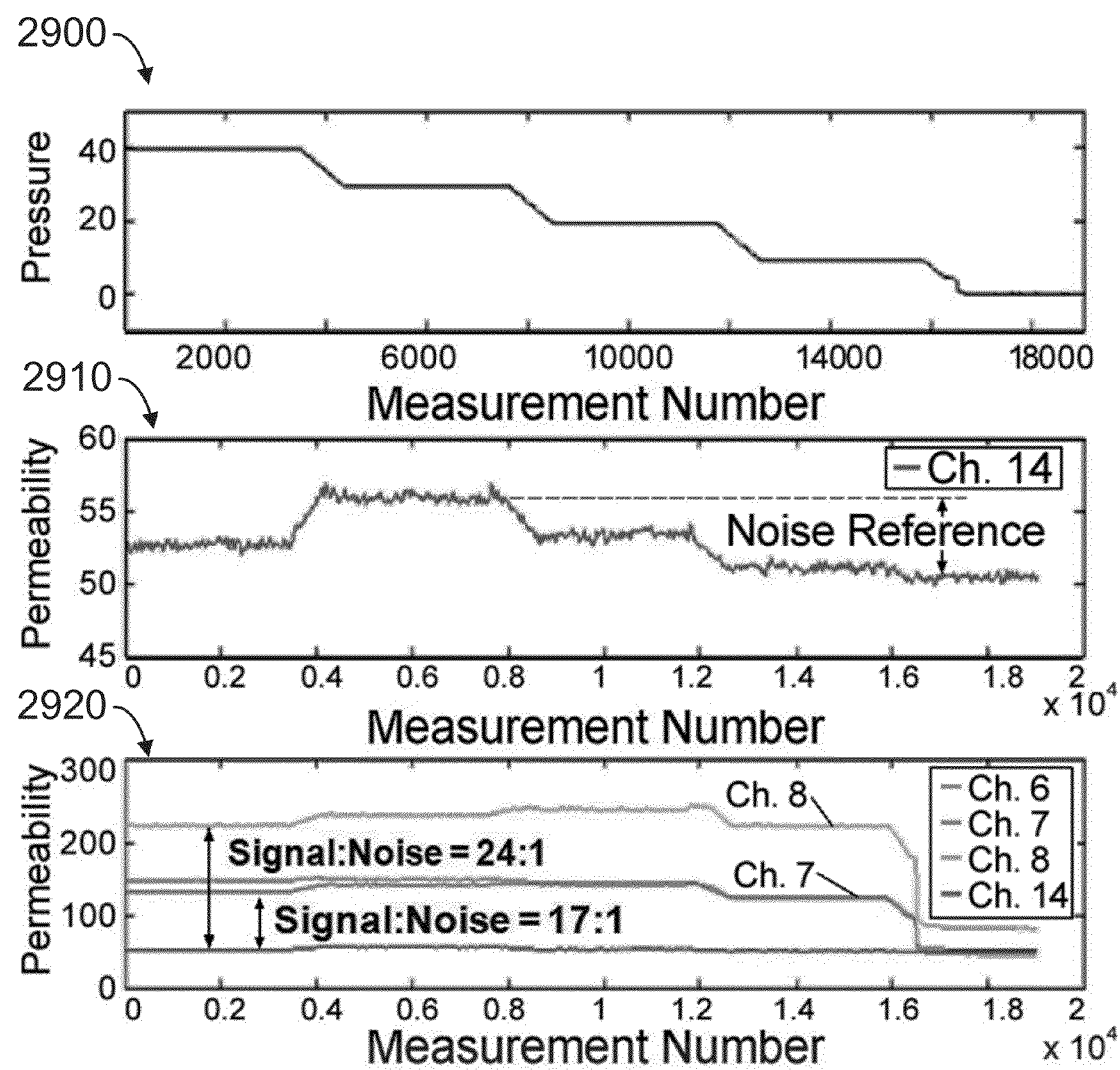

After the full-scale pressure test was completed, the internal pressure of the pipe was stepped down from 40 bars to approximately 0 bars, at 10 bar intervals. Plots 2910 and 2920, FIG. 29, show the permeability changes due to the stepped pressure response, as measured by the FA178. Plot 2900 shows the internal pressure of the pipe (plotted versus measurement number) being reduced from 40 bars. Plot 2910 shows the permeability from a channel that was determined to be away from the cracks (Channel 14). Plot 2920 shows additional channels were there were cracks. These plots were used to estimate the signal to noise level, which was as high as 24:1. However, the noise level in that calculation included both measurement noise and legitimate permeability changes due to loading effects. If loading effects are removed the signal to noise is significantly higher.

Figure 30:
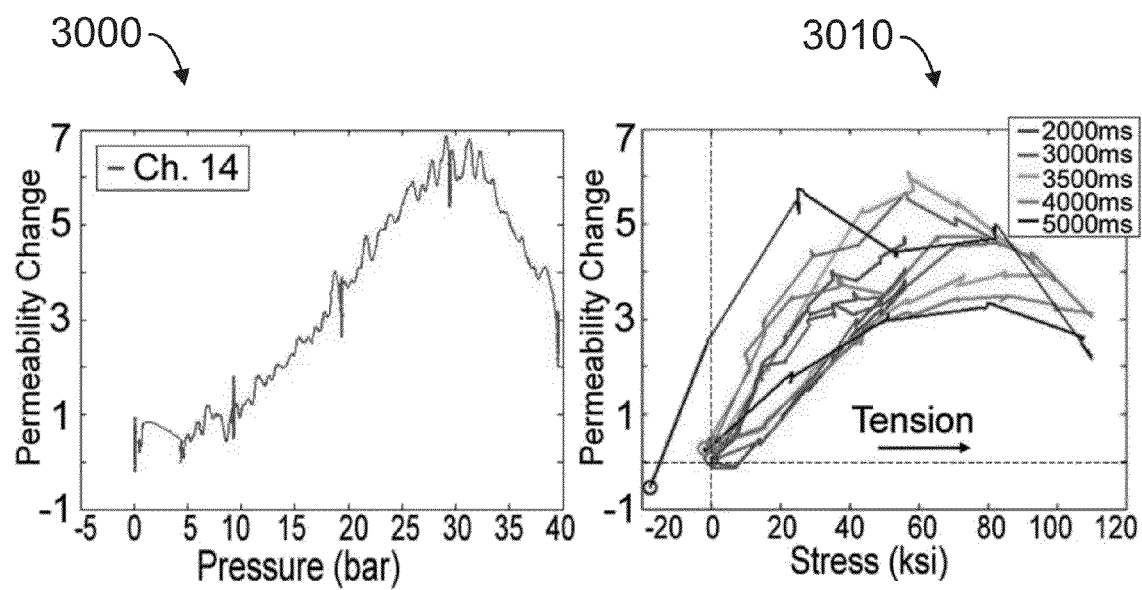

Plot 3000, FIG. 30, shows the data from the same load ramp as the data in Plots 2900-2920, but instead plots permeability change versus pressure for a channel away from the cracks. Plot 3010 is the permeability change versus stress for an X100 material. The curves can be seen to be similar in shape and similar in magnitude.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

In this respect, it should be appreciated that one implementation of the above-described embodiments comprises at least one computer-readable medium encoded with a computer program (e.g., a plurality of instructions), which, when executed on a processor, performs some or all of the above-discussed functions of these embodiments. As used herein, the term "computer-readable medium" encompasses only a computer-readable medium that can be considered to be a machine or a manufacture (i.e., article of manufacture). A computer-readable medium may be, for example, a tangible medium on which computer-readable information may be encoded or stored, a storage medium on which computer-readable information may be encoded or stored, and/or a non-transitory medium on which computer-readable information may be encoded or stored. Other non-exhaustive examples of computer-readable media include a computer memory (e.g., a ROM, a RAM, a flash memory, or other type of computer memory), a magnetic disc or tape, an optical disc, and/or other types of computer-readable media that can be considered to be a machine or a manufacture.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method for estimating yield stress of a component, the method comprising:
   positioning a sensor proximal to the component;
   measuring, with at least an impedance instrument and the sensor, magnetic permeability of the component at a plurality of stress levels; and
   estimating the yield stress as a function of the magnetic permeabilities and the corresponding stress levels.

2. The method of claim 1 wherein estimating the yield stress comprises:
   estimating a peak magnetic permeability and corresponding stress level from the measured magnetic permeabilities; and
   estimating the yield stress as a function of the stress level corresponding to the peak magnetic permeability.

3. The method of claim 2, wherein the function used to estimate the yield stress is a multiple of the stress level corresponding to the peak magnetic permeability.

4. The method of claim 3, wherein the yield stress is estimated as two times the stress level corresponding to the peak magnetic permeability.

5. The method of claim 1, wherein the component is a pipe and the sensor is positioned at an inside surface of the pipe.

6. The method of claim 5, wherein an operating pressure inside the pipe is varied to achieve the plurality of stress levels for the measuring act.

7. The method of claim 6, wherein the measuring with at least the impedance instrument and the sensor, comprises running an in-line inspection (ILI) tool inside the pipe, wherein the impedance instrument and the sensor are integrated into the ILI tool.

8. The method of claim 7, further comprising:
   identifying a material type of a segment or joint of the pipe using the estimated yield stress.

9. The method of claim 1, wherein the plurality of stress levels are estimated using an independent measure.

10. The method of claim 9, wherein the independent measure is a stress-strain relationship and a strain gauge.

11. The method of claim 9, wherein the component is a pipe and the independent measure for estimating the stress level is a pressure inside the pipe.

12. The method of claim 1, wherein the sensor is an eddy-current sensor.

13. The method of claim 1, wherein the sensor is a magnetoresistive sensor.

14. The method of claim 1, wherein:
   the component is a pipe;
   the positioning comprises positioning the sensor proximal to an outside surface of the pipe; and
   the plurality of stress levels are achieved by pressurizing the pipe to a first pressure and a second pressure.

15. An apparatus for estimating the yield strength of a component, the apparatus comprising:
   a magnetic permeability sensor positioned near the component and configured to determine the magnetic permeability of the component;
   a second sensor configured to measure a property from which stress level of the component is determined; and
   a processor configured to determine a magnetic permeability-stress relationship from data recorded by the magnetic permeability sensor and the second sensor, and estimate the yield stress from the determined magnetic permeability-stress relationship.

16. The apparatus of claim 15, wherein the processor is configured to identify a peak in the magnetic permeability-stress response and estimate the yield stress as a multiple of the stress level at the peak.

17. The apparatus of claim 16, wherein the multiple is in the range of 1.8 and 2.5.

18. The apparatus of claim 15 wherein the magnetic permeability sensor is an eddy-current sensor.

19. The apparatus of claim 15, wherein the magnetic permeability sensor and second sensor are integrated into an inline inspection tool.

20. The apparatus of claim 19, wherein the second sensor is a pressure sensor.

* * * * *